(12) United States Patent
Prakash et al.

(10) Patent No.: US 10,199,957 B1
(45) Date of Patent: Feb. 5, 2019

(54) DC-AC BIDIRECTIONAL CONVERTER

(71) Applicant: SCHNEIDER ELECTRIC IT CORPORATION, West Kingston, RI (US)

(72) Inventors: Indra Prakash, Bangalore (IN); Damir Klikic, Waltham, MA (US); Hariom Agrawal, Bengaluru (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 15/802,614

(22) Filed: Nov. 3, 2017

(51) Int. Cl.
*H02M 7/797* (2006.01)
*H02M 7/5395* (2006.01)
*H02M 3/158* (2006.01)
*H02M 7/5387* (2007.01)
*H02M 1/44* (2007.01)
*H02M 3/335* (2006.01)
*H02J 9/06* (2006.01)
*H02M 7/48* (2007.01)
*H02M 1/00* (2006.01)

(52) U.S. Cl.
CPC .......... *H02M 7/5395* (2013.01); *H02J 9/062* (2013.01); *H02M 1/44* (2013.01); *H02M 3/1582* (2013.01); *H02M 3/33584* (2013.01); *H02M 7/5387* (2013.01); *H02M 7/4807* (2013.01); *H02M 2001/007* (2013.01)

(58) Field of Classification Search
CPC ............ H02M 7/00; H02M 7/66; H02M 7/68; H02M 7/79; H02M 7/797; H02M 7/81; H02M 2001/0083
See application file for complete search history.

(56) References Cited

U.S. PATENT DOCUMENTS 8,288,887 B2 * 10/2012 Ransom .............. B60L 11/1811
307/10.1
8,466,658 B2 * 6/2013 Kajouke .......... H02M 3/33584
320/128

* cited by examiner

*Primary Examiner* — Gary L Laxton
(74) *Attorney, Agent, or Firm* — Lando & Anastasi, LLP

(57) ABSTRACT

According to one aspect, embodiments herein provide a bidirectional converter comprising a first interface, an input bridge coupled to the first interface, an inverter portion coupled to the input bridge and comprising a first bidirectional converter, a second bidirectional converter, and an output filter coupled to the first bidirectional converter and the second bidirectional converter, a second interface coupled to the output filter, and a controller configured to operate the input bridge to draw DC power from a DC source and provide power to the inverter portion, to operate, in a first mode, the first bidirectional converter, in conjunction with the output filter, to generate a positive half cycle of an output voltage waveform at the second interface, and to operate, in a second mode, the second bidirectional converter, in conjunction with the output filter, to generate a negative half cycle of the output voltage waveform at the second interface.

16 Claims, 30 Drawing Sheets

DC-AC BIDIRECTIONAL CONVERTER

BACKGROUND OF THE INVENTION

Field of the Invention

At least one example in accordance with the present invention relates generally to DC-AC power converters.

Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's, as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

A conventional online UPS rectifies input power provided by an electric utility using a Power Factor Correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, a DC-AC inverter generates an AC output voltage to the load. Since the DC bus is powered either by mains or the battery, the output power of the UPS is uninterrupted if the mains fails and the battery is sufficiently charged. A conventional off-line UPS normally connects a load directly to utility power. When utility power is insufficient to power the load, the off-line UPS operates a DC-AC inverter to convert DC power from a backup power source (e.g., a battery) into desired AC power, which is provided to the load.

SUMMARY

Aspects in accord with the present invention are directed to a DC-AC bidirectional converter comprising a first interface configured to be coupled to a DC source, an input bridge coupled to the first interface, an inverter portion coupled to the input bridge and comprising a first bidirectional converter coupled to the input bridge, a second bidirectional converter coupled to the input bridge, and an output filter coupled to the first bidirectional converter and the second bidirectional converter, a second interface coupled to the output filter and configured to be coupled to a load, and a controller configured to operate the input bridge to draw DC power from the DC source and provide power to the inverter portion, to operate, in a first mode of operation, the first bidirectional converter, in conjunction with the output filter, to generate a positive half cycle of an output voltage waveform at the second interface, and to operate, in a second mode of operation, the second bidirectional converter, in conjunction with the output filter, to generate a negative half cycle of the output voltage waveform at the second interface.

According to one embodiment, the first bidirectional converter comprises a first transformer including a first primary winding and a first secondary winding, the first primary winding including a first end and a second end coupled to the input bridge, and the first secondary winding including a first end coupled to a first center tap via a first portion and a second end coupled to the first center trap via a second portion, a first switch coupled between the first end of the first secondary winding and the second interface, and a second switch coupled between the second end of the first secondary winding and the second interface.

According to another embodiment, the second bidirectional converter comprises a second transformer including a second primary winding and a second secondary winding, the second primary winding including a first end and a second end coupled to the input bridge, and the second secondary winding including a first end coupled to a second center tap via a first portion and a second end coupled to the second center trap via a second portion, a third switch coupled between the first end of the second secondary winding and neutral, and a fourth switch coupled between the second end of the second secondary winding and neutral. In one embodiment, the output filter comprises an output filter coupled between the first center tap and the second center tap. In another embodiment, the output filter comprises an output capacitor coupled between the second interface and neutral.

According to one embodiment, the input bridge comprises a plurality of switches coupled to the first interface, the first end of the first primary winding, and the second end of the second primary winding, and a shared line coupled to the plurality of switches, the second end of the first primary winding, and the first end of the second primary winding. In one embodiment, the plurality of switches comprises a fifth switch coupled between the first interface and the first end of the first primary winding, a sixth switch coupled between the first interface and the shared line, and a seventh switch coupled between the first interface and the second end of the second primary winding. In another embodiment, the plurality of switches further comprises an eighth switch coupled between the first end of the first primary winding and the DC source, a ninth switch coupled between the shared line and the DC source, and a tenth switch coupled between the second end of the second primary winding and the DC source.

According to another embodiment, the controller is further configured to operate, in the first mode of operation, the second bidirectional converter to suppress flux in the second secondary winding generated by current through the third switch with flux in the second secondary winding generated by current through the fourth switch. In one embodiment, the controller is further configured to operate, in the second mode of operation, the first bidirectional converter to suppress flux in the first secondary winding generated by current through the first switch with flux in the first secondary winding generated by current through the second switch.

According to one embodiment, the first interface is further configured to be coupled to an AC source and to receive input AC power from the AC source, and the controller is further configured to operate the first bidirectional converter, in conjunction with the second bidirectional converter and the input bridge, to provide DC power, derived from the input AC power, to the first interface.

Another aspect in accord with the present invention is directed to a method for operating a DC-AC inverter comprising a first interface configured to be coupled to a DC source, an input bridge coupled to the first interface, an inverter portion coupled to the input bridge, and a second interface configured to be coupled to a load, the inverter portion comprising a first bidirectional converter coupled to the input bridge, a second bidirectional converter coupled to the input bridge, and an output filter coupled to the first bidirectional converter and the second bidirectional converter, the method comprising drawing, with the input bridge via the first interface, DC power from the DC source to the inverter portion, generating, in a first mode of operation with the first bidirectional converter in conjunction with the output filter, a positive half cycle of an output voltage waveform at the second interface, and generating, in a second mode of operation with the second bidirectional converter in conjunction with the output filter, a negative half cycle of an output voltage waveform at the second interface.

According to one embodiment, the first bidirectional converter comprises a first transformer, a first switch, and a second switch, the first transformer including a first primary winding and a first secondary winding, the first secondary winding including a first end coupled to a first center tap via a first portion and a second end coupled to the first center trap via a second portion, the first switch coupled between the first end of the first secondary winding and the second interface, and the second switch coupled between the second end of the first secondary winding and the second interface, wherein the input bridge comprises a plurality of switches coupled to the first interface, the first transformer, and the second transformer, and wherein generating, in the first mode of operation with the first bidirectional converter in conjunction with the output filter, the positive half cycle of the output voltage waveform includes operating the first switch, the second switch, and the plurality of switches to generate the positive half cycle of the output voltage waveform at the second interface.

According to another embodiment, the second bidirectional converter comprises a second transformer, a third switch, and a fourth switch, the second transformer including a second primary winding and a second secondary winding, the second secondary winding including a first end coupled to a second center tap via a first portion and a second end coupled to the second center trap via a second portion, the third switch coupled between the first end of the second secondary winding and neutral, and the fourth switch coupled between the second end of the second secondary winding and neutral, wherein generating, in the second mode of operation with the second bidirectional converter in conjunction with the output filter, the negative half cycle of the output voltage waveform includes operating the third switch, the fourth switch, and the plurality of switches to generate the negative half cycle of the output voltage waveform at the second interface.

According to one embodiment, the method further comprises operating, in the first mode of operation, the second bidirectional converter to suppress flux in the second secondary winding generated by current through the third switch with flux in the second secondary winding generated by current through the fourth switch. In one embodiment, the method further comprises operating, in the second mode of operation, the first bidirectional converter to suppress flux in the first secondary winding generated by current through the first switch with flux in the first secondary winding generated by current through the second switch.

According to another embodiment, the first interface is further configured to be coupled to an AC source, and the method further comprises receiving input AC power from the AC source, and operating the first bidirectional converter, in conjunction with the second bidirectional converter and the input bridge, to provide DC power, derived from the input AC power, to the first interface to charge the DC source.

At least one aspect in accord with the present invention is directed to a DC-AC bidirectional converter comprising a first interface configured to be coupled to a DC source, an input bridge coupled to the first interface, a second interface configured to be coupled to a load, and means for converting DC power from the DC source into an output AC sine wave at the second interface using symmetrical DC-DC conversion paths coupled to the input bridge in parallel and absent use of an intermediate energy storage section.

According to one embodiment, the DC-DC bidirectional converter further comprises means for sharing a connection between the symmetrical DC-DC conversion paths and the input bridge. In one embodiment, the second interface is further configured to be coupled to an AC source, and the DC-DC bidirectional converter further comprises means for converting AC power from the AC source into DC power to charge the DC source using the symmetrical DC-DC conversion paths coupled to the input bridge in parallel and absent use of an intermediate energy storage section.

DETAILED DESCRIPTION OF THE INVENTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As described above, UPS's typically include converters (e.g., inverters) which are configured to convert DC power from a DC source (e.g., a DC bus, a PFC rectifier, a battery, etc.) into AC power which is provided to a load. Conventional DC-AC converters are typically constructed using two power converters in series. For example, the front end of a conventional DC-AC converter may comprise a DC-DC converter followed by a full bridge, half bridge or a multi-level inverter. This legacy approach can suffer from low overall efficiency and/or require an energy storage device located between the two power stages.

Figure 1:
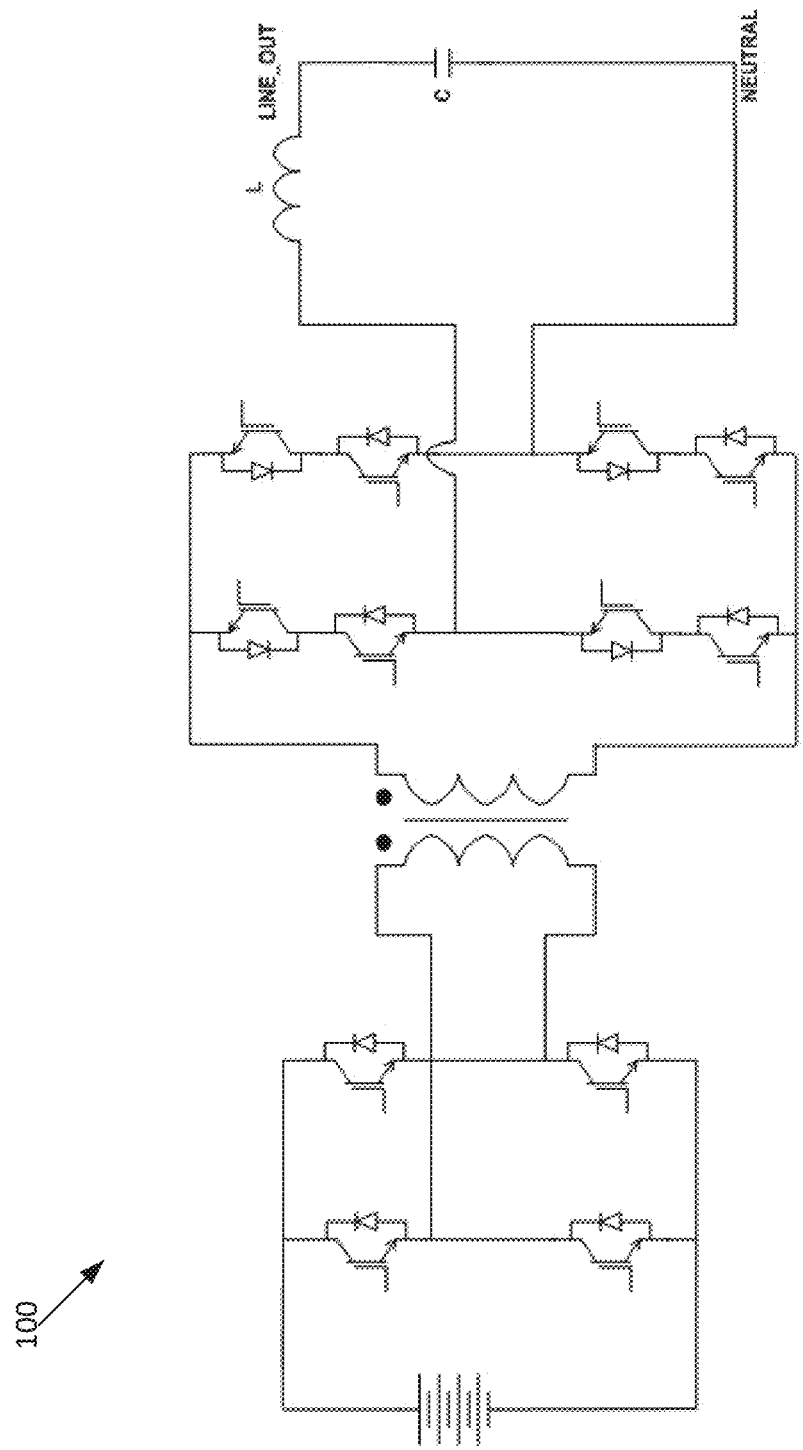
FIG. 1 is a circuit diagram of one example of a conventional DC-AC converter.

One embodiment of a conventional DC-AC converter 100 is shown in FIG. 1. As shown in FIG. 1, a DC input of the converter 100 is converted into high frequency square wave pulses by a plurality of switches, and the high frequency square wave pulses are chopped using a matrix converter to generate an output sine wave. There are two common limitations to the inverter shown in FIG. 1. First, the secondary switches of the matrix converter operate at high frequency and losses can be relatively high. Second, the Pulse Width Modulation (PWM) switch control generally needs to be very accurate.

Figure 2:
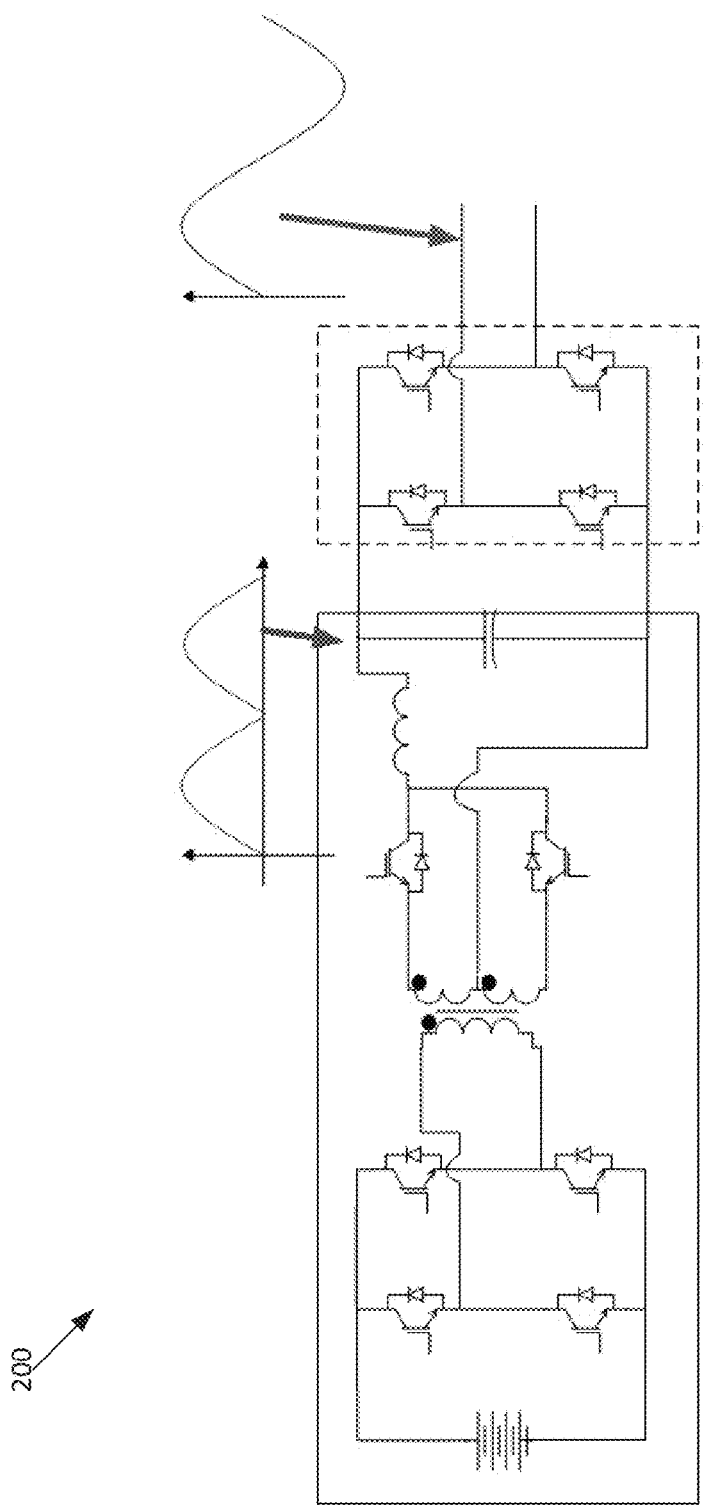
FIG. 2 is a circuit diagram of another example of a conventional DC-AC converter.

Another embodiment of a DC-AC converter 200 is shown in FIG. 2, where a full bridge bi-directional DC-DC converter is first used to generate a full wave rectified sine wave, and then a polarity reversing bridge is utilized to convert the rectified sine wave into an output sine wave. However, a proper sine wave (i.e., a sine wave having a zero crossing) cannot typically be generated using the converter of FIG. 2, as the DC-DC converter of FIG. 2 is a two quadrant converter only capable of generating positive voltage.

DC-AC bidirectional converters are described herein that may provide a variety of advantages when compared to conventional DC-AC converters, such as single stage power conversion, higher efficiency, bi-directional power flow, and/or the elimination of an intermediate energy storage device. These advantages can lead to a higher reliability, higher efficiency and/or lower cost DC-AC converter. The topology of a DC-AC converter in accordance with one embodiment is discussed below with respect to FIG. 3.

Figure 3:
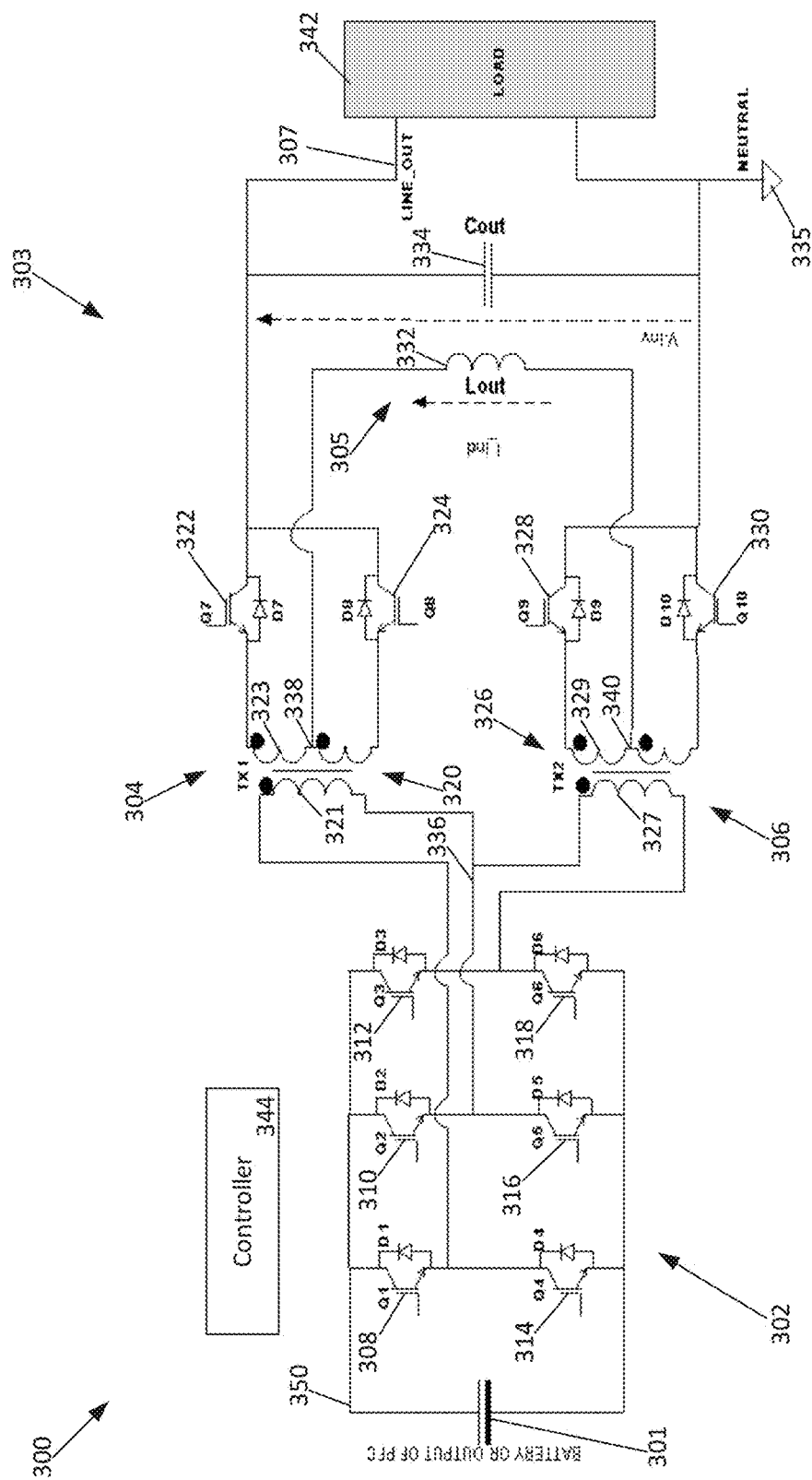
FIG. 3 is a circuit diagram of one embodiment of a DC-AC converter in accordance with aspects of the present invention.

FIG. 3 is a circuit diagram of one embodiment of a DC-AC converter 300 in accordance with aspects described herein. The DC-AC converter 300 includes an input DC-DC bridge 302, an inverter section 303, and interfaces 307, 350 to provide input/output capabilities.

The input DC-DC bridge 302 includes a plurality of switches having a first switch (Q1) 308, a second switch (Q2) 310, a third switch (Q3) 312, a fourth switch (Q4) 314, a fifth switch (Q5) 316, and a sixth switch (Q6) 318. According to one embodiment, the switches of the DC-DC bridge 302 are Insulated-Gate Bipolar Transistors (IGBT). In such an embodiment (e.g., as shown in FIG. 3), the collectors of the first switch (Q1) 308, the second switch (Q2) 316, and the third switch (Q3) 312 are configured to be coupled to a DC source 301 via an interface 350, the emitter of the first switch (Q1) 308 is coupled to the collector of the fourth switch (Q4) 314, the emitter of the second switch (Q2) 310 is coupled to the collector of the fifth switch (Q5) 316, and the emitter of the third switch (Q3) 312 is coupled to the collector of the sixth switch (Q6) 318. According to at least one embodiment, each switch in the DC-DC bridge 302 includes a diode coupled between its emitter and collector. In one embodiment, the DC source 301 is a battery; however, in at least one embodiment, the DC source 301 is a DC bus coupled to the PFC rectifier of a UPS. As shown in FIG. 3, the switches of the DC-DC bridge 302 are IGBTs; however, in other embodiments, the switches of the DC-DC bridge 302 can be different types of switches and/or transistors (e.g., Field-Effect Transistors (FET) or Metal-Oxide-Semiconductor Field-Effect Transistors (MOSFET)).

The inverter section 303 includes a positive side bi-directional DC-DC converter 304, a negative side bi-directional DC-DC converter 306, and an output filter 305. The positive side bi-directional DC-DC converter 304 includes a first transformer (TX1) 320, a seventh switch (Q7) 322, and an eight switch (Q8) 324. The first transformer (TX1) 320 includes a primary winding 321 and a secondary winding 323. The negative side bi-directional DC-DC converter 306 includes a second transformer (TX2) 326, a ninth switch (Q9) 328, and a tenth switch (Q10) 330. The second transformer (TX2) 326 includes a primary winding 327 and a secondary winding 329. The output filter 305 includes an inductor (Lout) 332 and a capacitor (Cout) 334.

According to one embodiment, the switches of the inverter section 303 are IGBTs. In such an embodiment (e.g., as shown in FIG. 3), the emitter of the seventh switch (Q7) 322 is coupled to a first end 353 of the secondary winding 323, the collector of the seventh switch (Q7) 322 is coupled to the interface 307, the emitter of the eighth switch (Q8) 324 is coupled to a second end 355 of the secondary winding 323, the collector of the eighth switch (Q8) 324 is coupled to the interface 307, the emitter of the ninth switch (Q9) 328 is coupled to a first end 357 of the secondary winding 329, the collector of the ninth switch (Q9) 328 is coupled to neutral 335, the emitter of the tenth switch (Q10) 330 is coupled to a second end 359 of the secondary winding 329, the collector of the tenth switch (Q10) 330 is coupled to neutral 335. According to at least one embodiment, each switch in the inverter section 303 includes a diode coupled between its emitter and collector. In other embodiments, the switches of the inverter section 303 can be different types of switches and/or transistors (e.g., Field-Effect Transistors (FET) or Metal-Oxide-Semiconductor Field-Effect Transistors (MOSFET)).

As shown in FIG. 3, a first end 361 of the primary winding 321 is coupled to the emitter of the first switch (Q1) 308 and a second end 363 of the primary winding 321 is coupled to the emitter of the second switch (Q2) 310 via a shared line 336. A first end 365 of the primary winding 327 is coupled to the emitter of the second switch (Q2) 310 via the shared line 336, and a second end 367 of the primary winding 321 is coupled to the emitter of the third switch (Q3) 312. The inductor 332 is coupled between a center tap 338 of the secondary winding 323 and a center tap 340 of the secondary winding 329. The capacitor 334 is coupled between the interface 307 and neutral 335. The output is configured to be coupled to a load 342. A controller 344 is coupled to the gate of each switch in the DC-AC converter 300 and is configured to control the operation of each switch via pulse signals.

When compared to the conventional DC-AC converters shown above in FIGS. 1-2, the DC/DC bridge 302 shown in FIG. 3 includes the extra shared line 336. When the DC/DC bridge 302 is operated by the controller 344 to draw power from the DC power source 301, current drawn from the DC power source 301 is DC superimposed with AC (as opposed to pure DC in a conventional DC/DC bridge). The DC power from the DC/DC bridge 302 is provided to the two DC-DC converters 304, 306 and each converter 304, 306 processes half of the received power. More specifically, in response to receiving the DC power from the DC/DC bridge 302, the positive side converter 304 is operated by the controller 344 to generate positive voltage whereas the negative side converter 306 is operated to generate negative voltage. Both converters operate over a respective half cycle and near zero crossover of the output sine wave, in conjunction with the output filter 305, to generate a proper output sine wave (with a proper zero crossing) at the interface 307.

Figure 4:
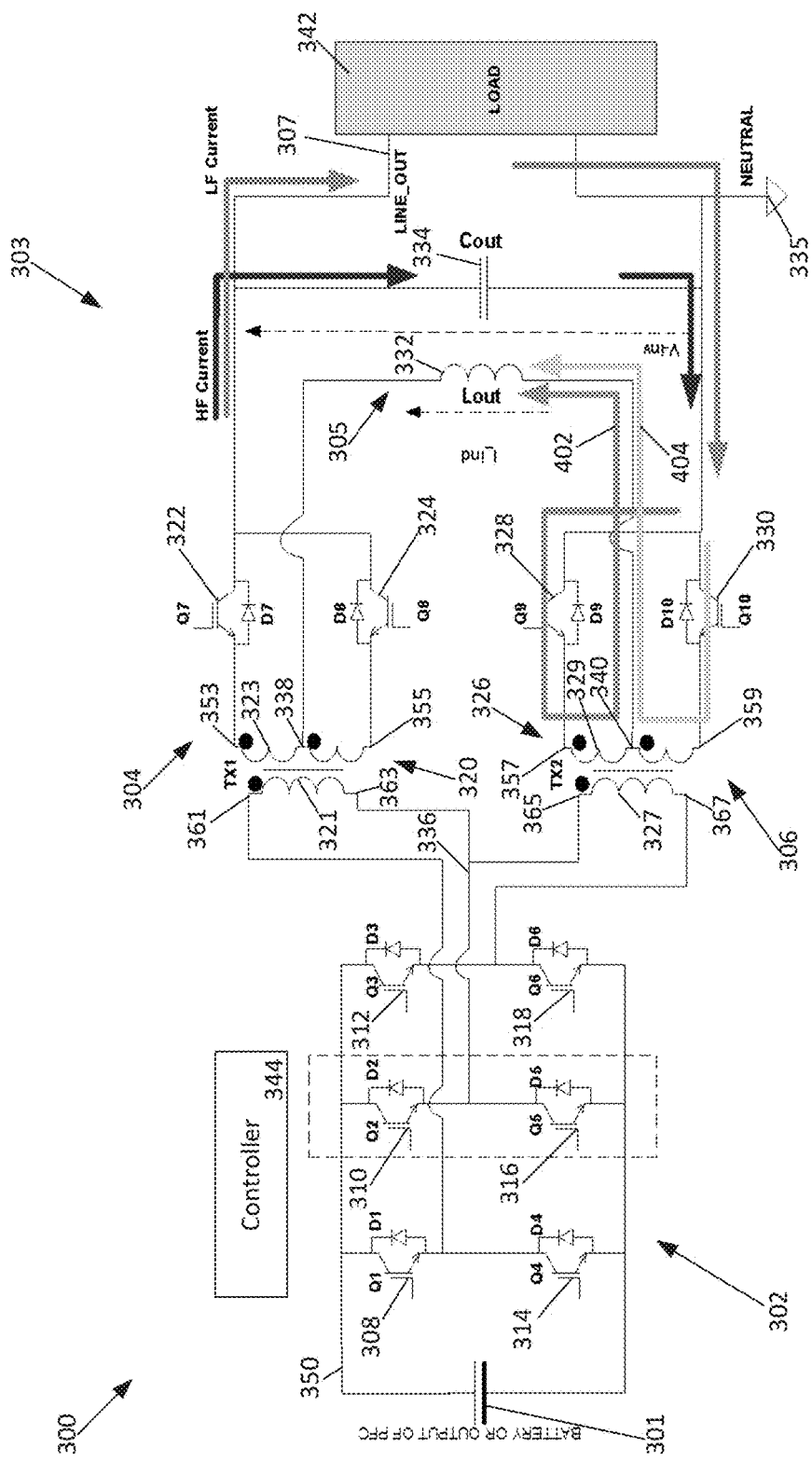
FIG. 4 is a circuit diagram illustrating operation of one embodiment of a DC-AC converter in accordance with aspects of the present invention.

One working principle of the DC-AC converter 300 is illustrated in FIG. 4. As shown in FIG. 4, when the DC-AC converter 300 is operating to generate the positive half of the sine wave at the interface 307, the controller 344 operates the DC-AC converter 300 to turn one leg of the DC-DC bridge 302 off (e.g., the leg including the third switch (Q3) 312 and the sixth switch (Q6) 318) and to turn on (i.e., close) the ninth switch (Q9) 328 and the tenth switch (Q10) 330. In this configuration, return current to the positive side converter 304 is via the negative side converter 306 as shown in FIG. 4. The current passed from neutral 335, through the ninth switch (Q9) 328, the tenth switch (Q10) 330, and the secondary winding 329, and returns to the center tap 338 of the first transistor (TX1) 320 via the inductor (Lout) 332. When the load current polarity is negative during the positive half cycle, the return current passes through the diodes (D9, D10) of the ninth switch (Q9) 328 and the tenth switch (Q10) 330, the secondary winding 329, and the inductor (Lout) 332.

The load current returning through the secondary winding 329 of the second transformer (TX2) 326 does not generate any flux, as the flux generated by each half of the secondary winding 329 cancel each other out. More specifically, flux in the secondary winding 329 generated by current through the ninth switch (Q9) 328, the diode (D9) of the ninth switch (Q9) 328, and the secondary winding 329 is suppressed by flux in the secondary winding 329 generated by current through the tenth switch (Q10) 330, the diode (D10) of the tenth switch (Q10) 330, and the secondary winding 329. As a result, no voltage is generated across the primary winding 327. In addition, the primary winding 327 is open as the third switch (Q3) 312 and the sixth switch (Q6) 318 are off (i.e., open). This will cause the terminal of the inductor (Lout) 332 coupled to the center tap 340 of the secondary winding 329 to be virtually connected to a negative side of the capacitor (Cout) 334 (i.e., the side of the capacitor 334 coupled to the secondary winding 329). Accordingly, in such operation, the DC-AC converter 300 operates as a bidirectional DC-DC converter using the first switch (Q1) 308, the second switch (Q2) 310, the fourth switch (Q4) 314, the fifth switch (Q5) 316, the seventh switch (Q7) 322, and the eighth switch (Q8) 324.

When the DC-AC converter 300 is operating to generate the negative half of the sine wave at the interface 307, the controller 344 operates the DC-AC converter 300 to turn one leg of the DC-DC bridge 302 off (e.g., the leg including the first switch (Q1) 308 and the fourth switch (Q4) 314) and to turn on the seventh switch (Q7) 322 and the eighth switch (Q8) 324. In this configuration, return current to the negative side converter 306 is via the positive side converter 304. The current passes through the seventh switch (Q7) 322, the eighth switch (Q8) 324, and the secondary winding 323, and returns to the center tap 340 of the second transistor (TX2) 326 via the inductor (Lout) 332. When the load current polarity is positive during the negative half cycle, the return current passes through the diodes (D7, D8) of the seventh switch (Q7) 322, the eighth switch (Q8) 324, the secondary winding 323, and the inductor (Lout) 332.

The load current returning through the secondary winding 323 of the first transformer (TX1) 320 does not generate any flux, as the flux generated by each half of the secondary winding 323 cancel each other out. More specifically, flux in the secondary winding 323 generated by current through the seventh switch (Q7) 322, the diode (D7) of the seventh switch (Q7) 322, and the secondary winding 323 is suppressed by flux in the secondary winding 323 generated by current through the eighth switch (Q8) 324, the diode (D8) of the eighth switch (Q8) 324, and the secondary winding 323. As a result, no voltage is generated across the primary winding 321. In addition, the primary winding 321 is open as the first switch (Q1) 308 and the fourth switch (Q4) 314 are off. This will cause the terminal of the inductor (Lout) 332 coupled to the center tap 338 of the secondary winding 323 to be virtually connected to a positive side of the capacitor (Cout) 334 (i.e., the side of the capacitor 334 coupled to the secondary winding 323). Accordingly, in such operation, the DC-AC converter 300 operates as a bidirectional DC-DC converter using the second switch (Q2) 310, the third switch (Q3) 312, the fifth switch (Q5) 316, the sixth switch (Q6) 318, the ninth switch (Q9) 328, and the tenth switch (Q10) 330.

Figure 5:
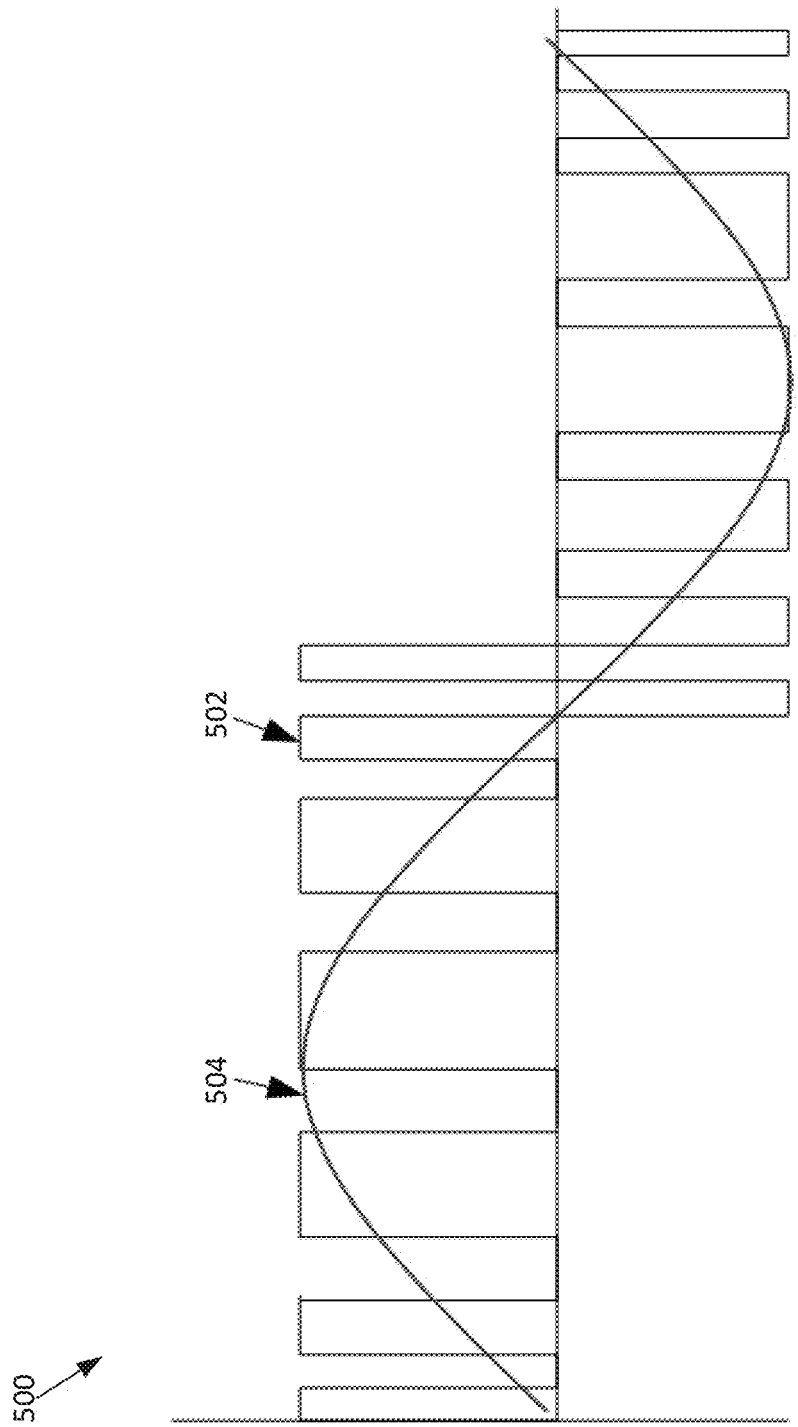
FIG. 5 is a graph illustrating operation of one embodiment of a DC-AC converter in accordance with aspects of the present invention.

As the waveform provided to the interface 307 is a sinewave, the controller 344 provides sinusoidal Pulse Width Modulation (PWM) based signals to the converter 300. Near zero crossover of the output waveform, both the positive side bi-directional DC-DC converter 304 and the negative side bi-directional DC-DC converter 306 are operated by the controller 344 to generate a substantially undistorted sinewave at the output. A basic illustration 500 of the pole voltage 502 of the inductor (Lout) 332 (i.e., the voltage of the center tap 338 of the first transformer 320 with respect to neutral 335) and the sinewave 504 at the interface 307 of the converter 300 is shown in FIG. 5. Additional details regarding the operation of the DC-AC converter 300 are discussed below with respect to FIGS. 6-13.

Figure 6:
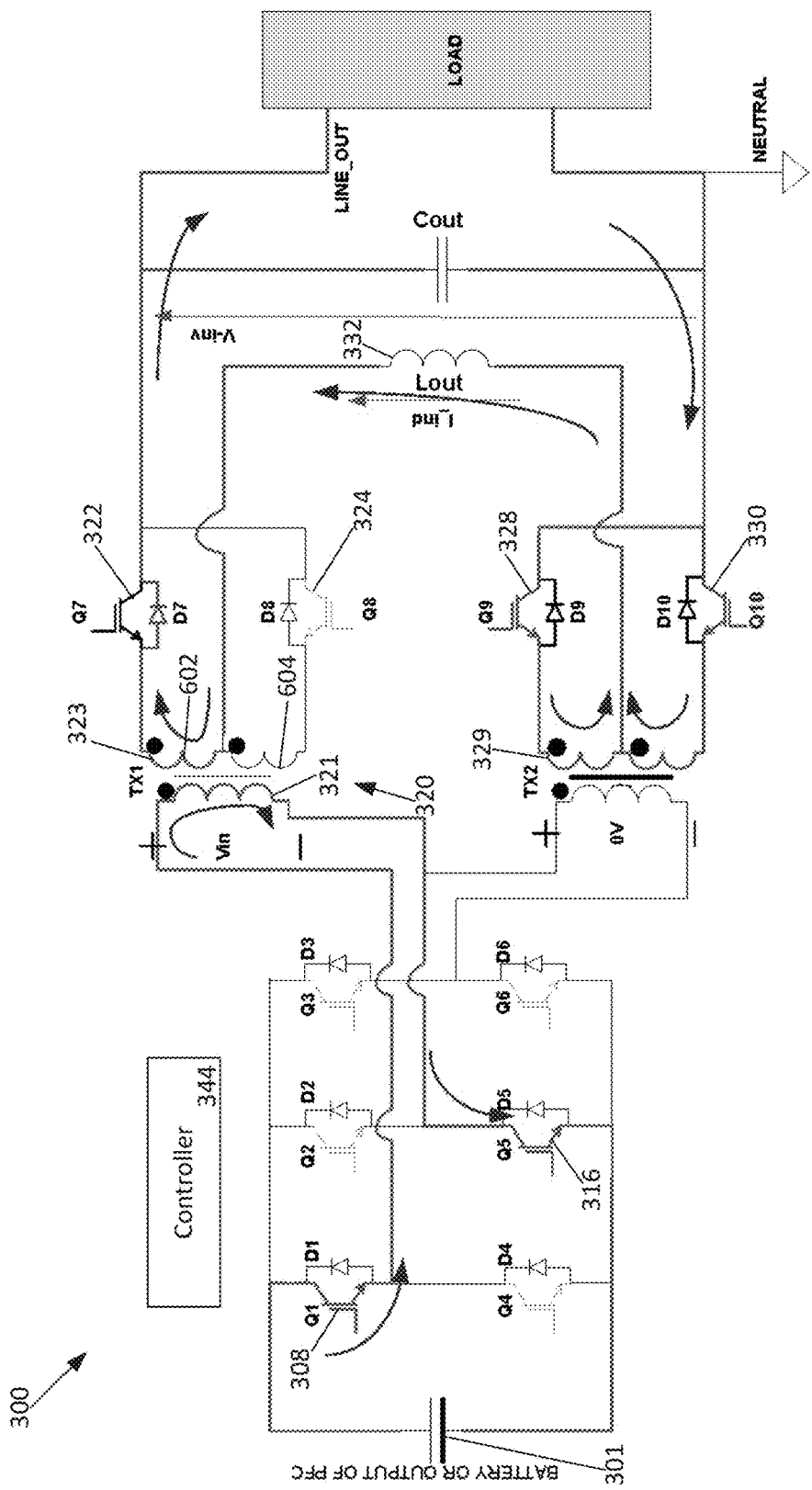
FIG. 6 is a circuit diagram illustrating operation of one embodiment of a DC-AC converter in a first charging state of a real power mode in accordance with aspects of the present invention.

According to at least one embodiment, the bidirectional DC-AC converter 300 is operated by the controller 344 as a DC-AC inverter to provide real output AC power to the load 342. Operation of the converter 300 in such a real power mode of operation is illustrated in FIGS. 6-13. FIG. 6 is a schematic diagram of the converter 300 illustrating operation of the converter 300 during a first charging state of the real power mode over a positive half-cycle. As shown in FIG. 6, in the first charging state, the first switch (Q1) 308 and the fifth switch (Q5) 316 are closed to apply a positive voltage, from the DC source 301, across the primary winding 321 of the first transformer (TX1) 320. As the positive voltage is applied across the primary winding 321, energy is transferred from the primary winding 321 to the inductor 332 via a first portion 602 of the secondary winding 323 and the diode (D7) of the seventh switch (Q7) 322. During this first charging state, the seventh switch (Q7) 322 is on and the eight switch (Q8) 324 is off. In the first charging state over the positive half line cycle, the ninth switch (Q9) 328 and the tenth switch (Q10) are closed and flux in the secondary winding 329 is canceled out, as described above.

Figure 7:
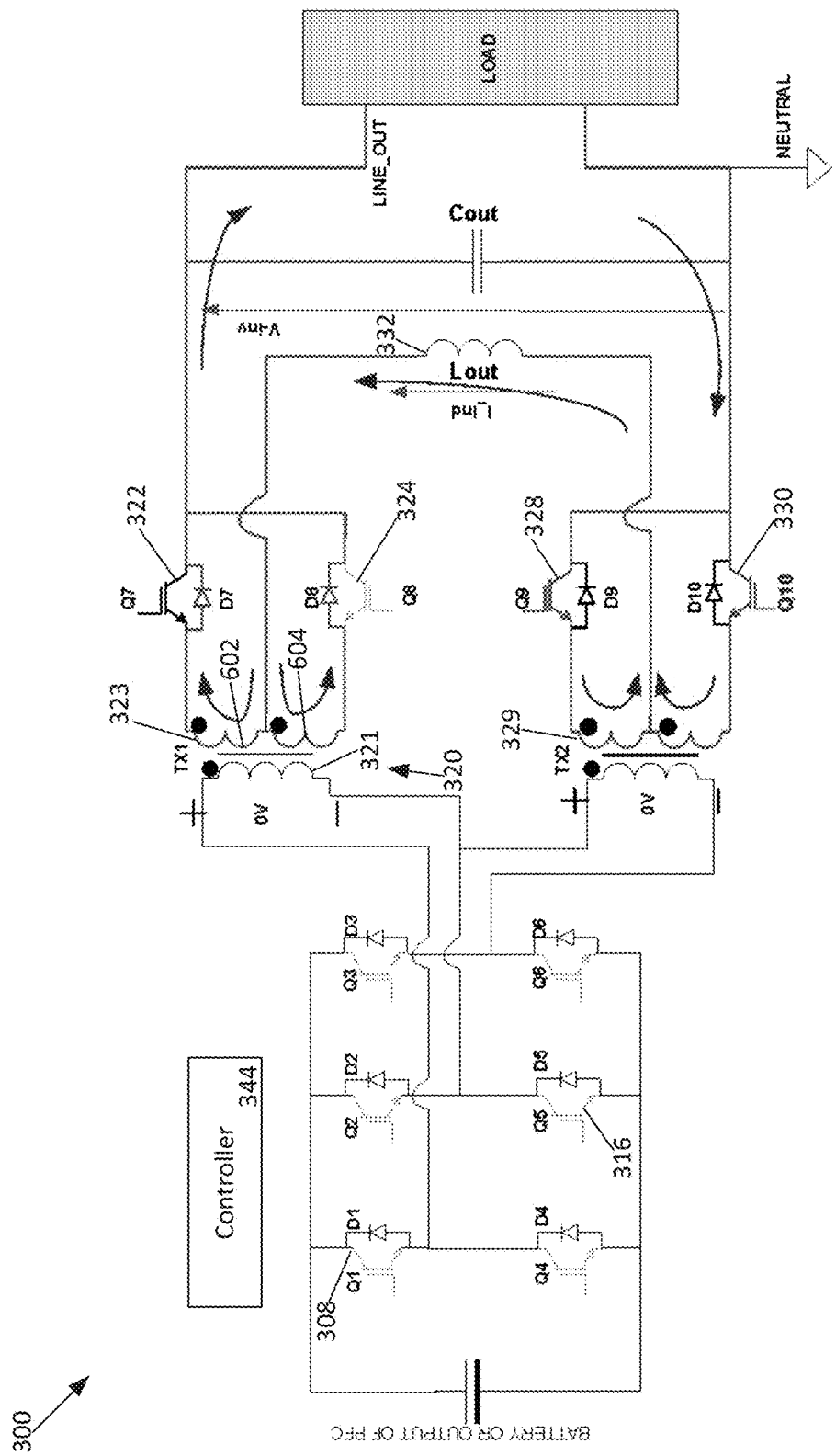
FIG. 7 is a circuit diagram illustrating operation of one embodiment of a DC-AC converter in a first freewheeling-start state of a real power mode in accordance with aspects of the present invention.

After the first charging state of the real power mode, the bidirectional DC-AC converter 300 is operated by the controller 344 in a first freewheeling-start state. As shown in FIG. 7, in the first freewheeling-start state, the first switch (Q1) 308 and the fifth switch (Q5) 316 are turned off, and inductor current freewheels through the first 602 and second 604 portions of the secondary winding 323, the diode (D7) of the seventh switch (Q7) 322, and the diode (D8) of the eighth switch (Q8) 324. During this first freewheeling-start state, the seventh switch (Q7) 322 is on and the eight switch (Q8) 324 is off. In the first freewheeling-start state over the positive half line cycle, the ninth switch (Q9) 328 and the tenth switch (Q10) are closed and flux in the secondary winding 329 is canceled out, as described above.

Figure 8:
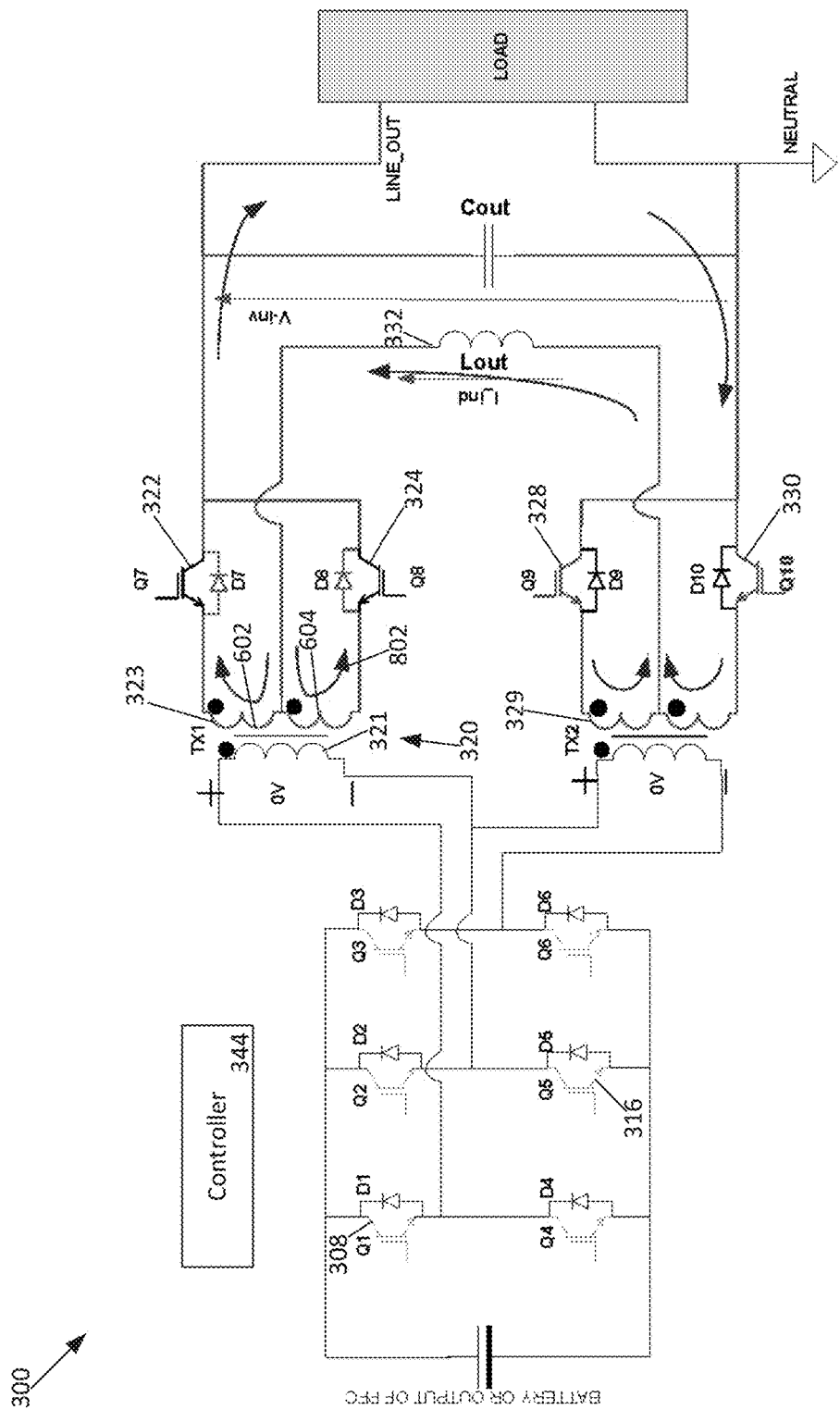
FIG. 8 is a circuit diagram illustrating operation of one embodiment of a DC-AC converter in a first freewheeling state of a real power mode in accordance with aspects of the present invention.

After the first freewheeling-start state of the real power mode, the bidirectional DC-AC converter 300 is operated by the controller 344 in a first freewheeling state. As shown in FIG. 8, in the first freewheeling state, the first switch (Q1) 308 and the fifth switch (Q5) 316 are turned off, inductor current continues to freewheel through the first 602 and second 604 portions of the secondary winding, the diode (D7) of the seventh switch (Q7) 322, and the diode (D8) of the eighth switch (Q8) 324, and the eighth switch (Q8) 324 is turned on. The eighth switch (Q8) 324 is turned on after a dead band period and only conducts current if the current 802 through the switch 324 is negative (e.g., in response to an inductive load). During this first freewheeling state, the seventh switch (Q7) 322 is on. In the first freewheeling state over the positive half line cycle, the ninth switch (Q9) 328 and the tenth switch (Q10) are closed and flux in the secondary winding 329 is canceled out, as described above.

Figure 9:
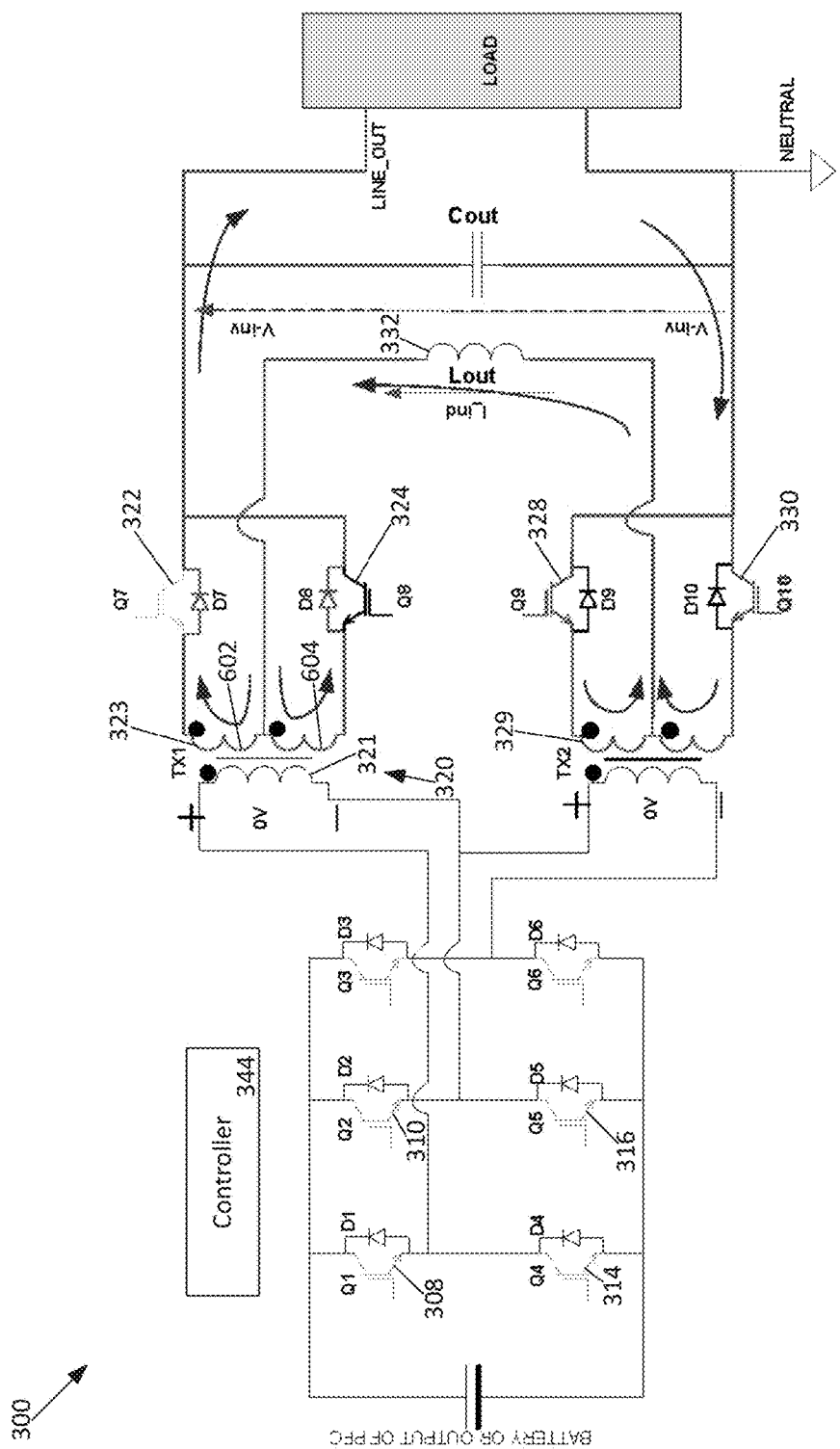
FIG. 9 is a circuit diagram illustrating operation of one embodiment of a DC-AC converter in a first freewheeling-end state of a real power mode in accordance with aspects of the present invention.

After the first freewheeling state of the real power mode, the bidirectional DC-AC converter 300 is operated by the controller 344 in a first freewheeling-end state. As shown in FIG. 9, in the first freewheeling-end state, the seventh switch (Q7) 322 is turned off to enable the turning on of the second switch (Q2) 310 and the fourth switch (Q4) 314 in the next state (i.e., after a dead band), and the freewheeling ends. In the first freewheeling-end state over the positive half line cycle, the ninth switch (Q9) 328 and the tenth switch (Q10) are closed and flux in the secondary winding 329 is canceled out, as described above.

Figure 10:
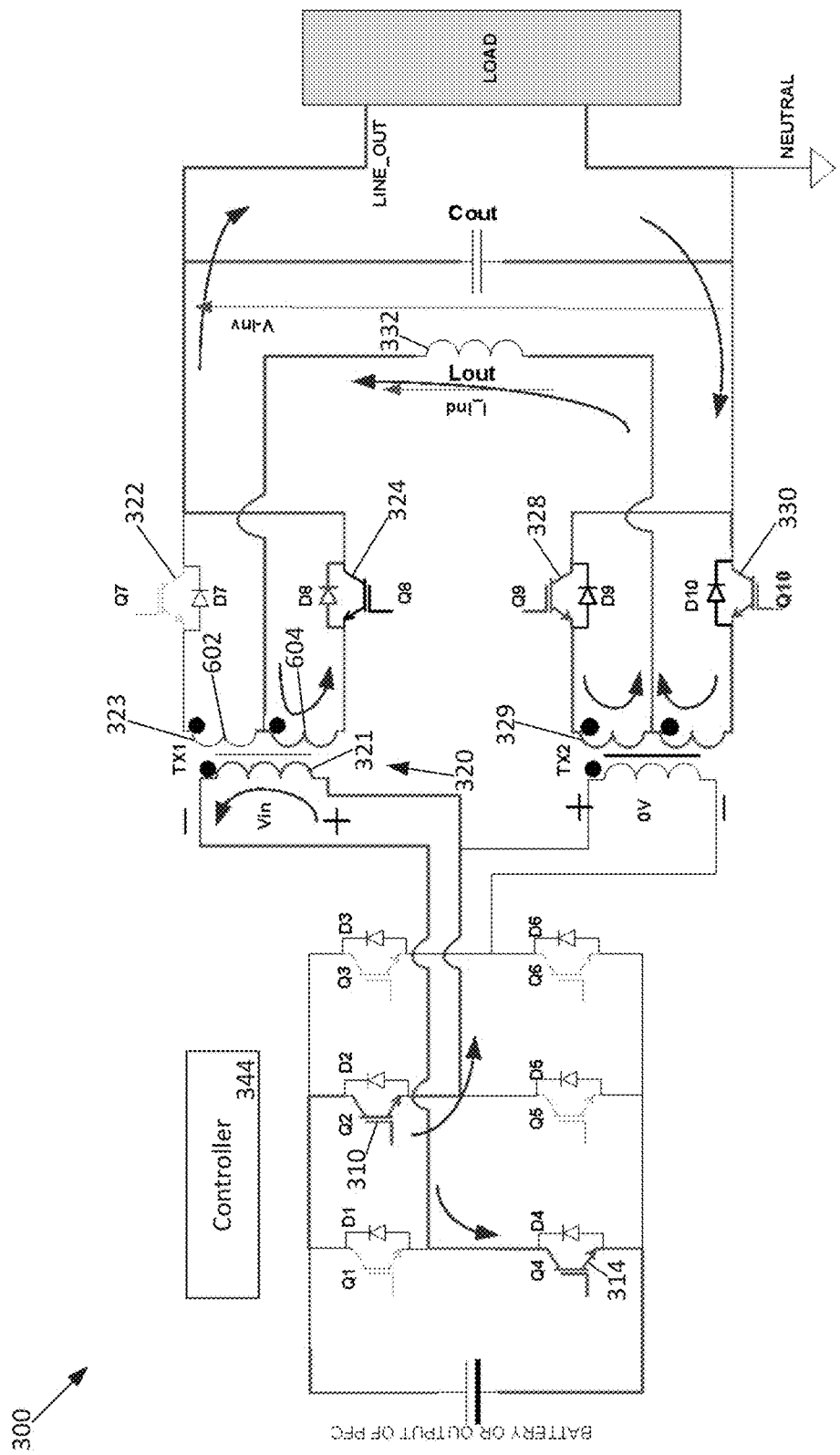
FIG. 10 is a circuit diagram illustrating operation of one embodiment of a DC-AC converter in a second charging state of a real power mode in accordance with aspects of the present invention.

After the first freewheeling-end state of the real power mode, the bidirectional DC-AC converter 300 is operated by the controller 344 in a second charging state. As shown in FIG. 10 in the second charging state, the second switch (Q2) 310 and the fourth switch (Q4) 314 are closed to apply a negative voltage, from the DC source 301, across the primary winding 321 of the first transformer (TX1) 320. The negative voltage is applied across the primary winding 321 to compensate for the positive voltage previously applied to the primary winding 321 in the first charging state. As the negative voltage is applied across the primary winding 321, energy is transferred to the inductor 332 via a second portion 604 of the secondary winding 323 and the diode (D8) of the eighth switch (Q7) 322. During this second charging state, the seventh switch (Q7) 322 is off and the eight switch (Q8) 324 is on. In the charging state over the positive half line cycle, the ninth switch (Q9) 328 and the tenth switch (Q10) are closed and flux in the secondary winding 329 is canceled out, as described above.

Figure 11:
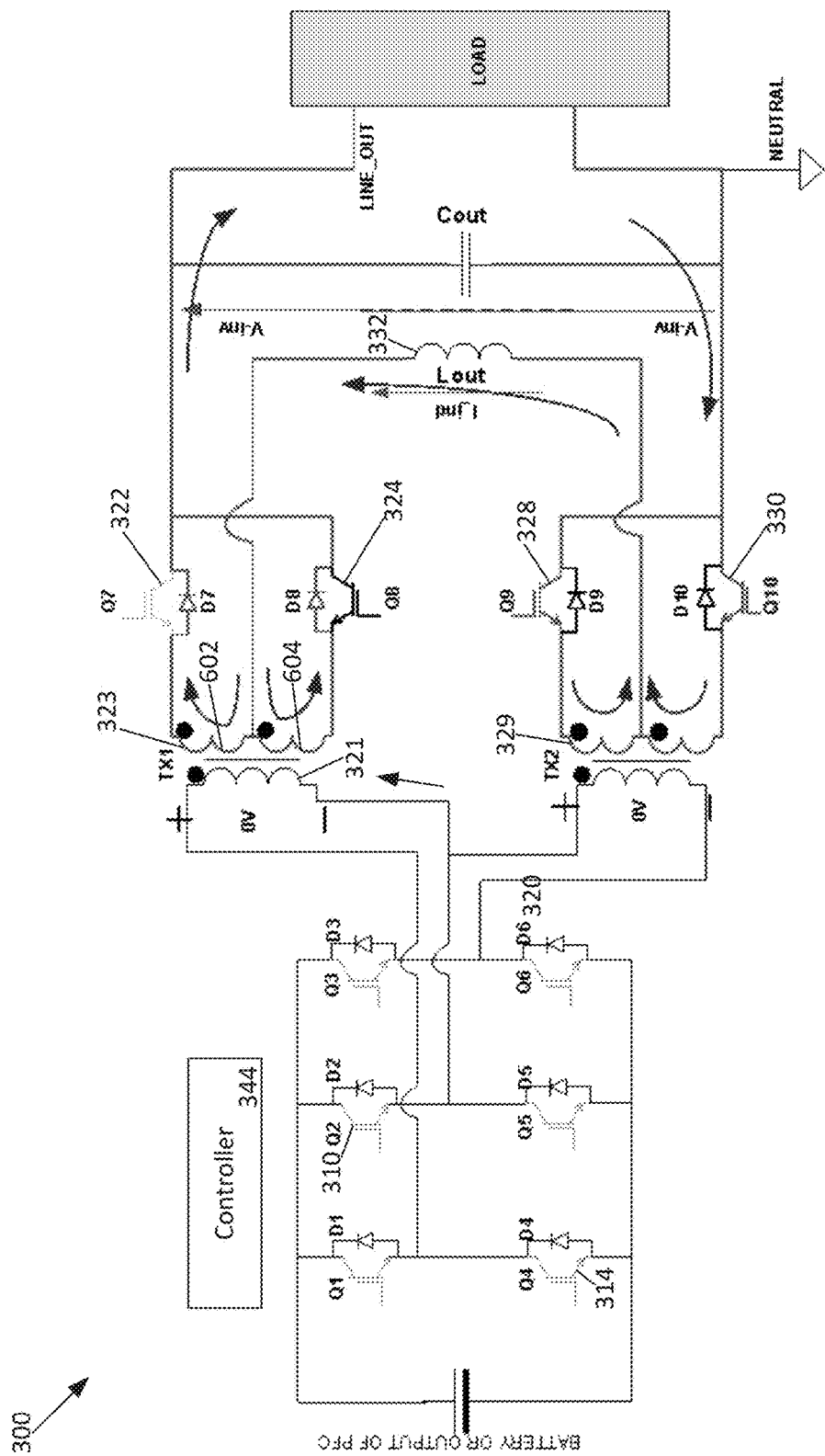
FIG. 11 is a circuit diagram illustrating operation of one embodiment of a DC-AC converter in a second freewheeling-start state of a real power mode in accordance with aspects of the present invention.

After the second charging state of the real power mode, the bidirectional DC-AC converter 300 is operated by the controller 344 in a second freewheeling-start state. As shown in FIG. 11, in the second freewheeling-start state, the second switch (Q2) 310 and the fourth switch (Q4) 314 are turned off, and inductor current freewheels through the first 602 and second 604 portions of the secondary winding 323, the diode (D7) of the seventh switch (Q7) 322, and the diode (D8) of the eighth switch (Q8) 324. During this second freewheeling-start state, the seventh switch (Q7) 322 is off and the eight switch (Q8) 324 is on. In the second freewheeling-start state over the positive half line cycle, the ninth switch (Q9) 328 and the tenth switch (Q10) are closed and flux in the secondary winding 329 is canceled out, as described above.

Figure 12:
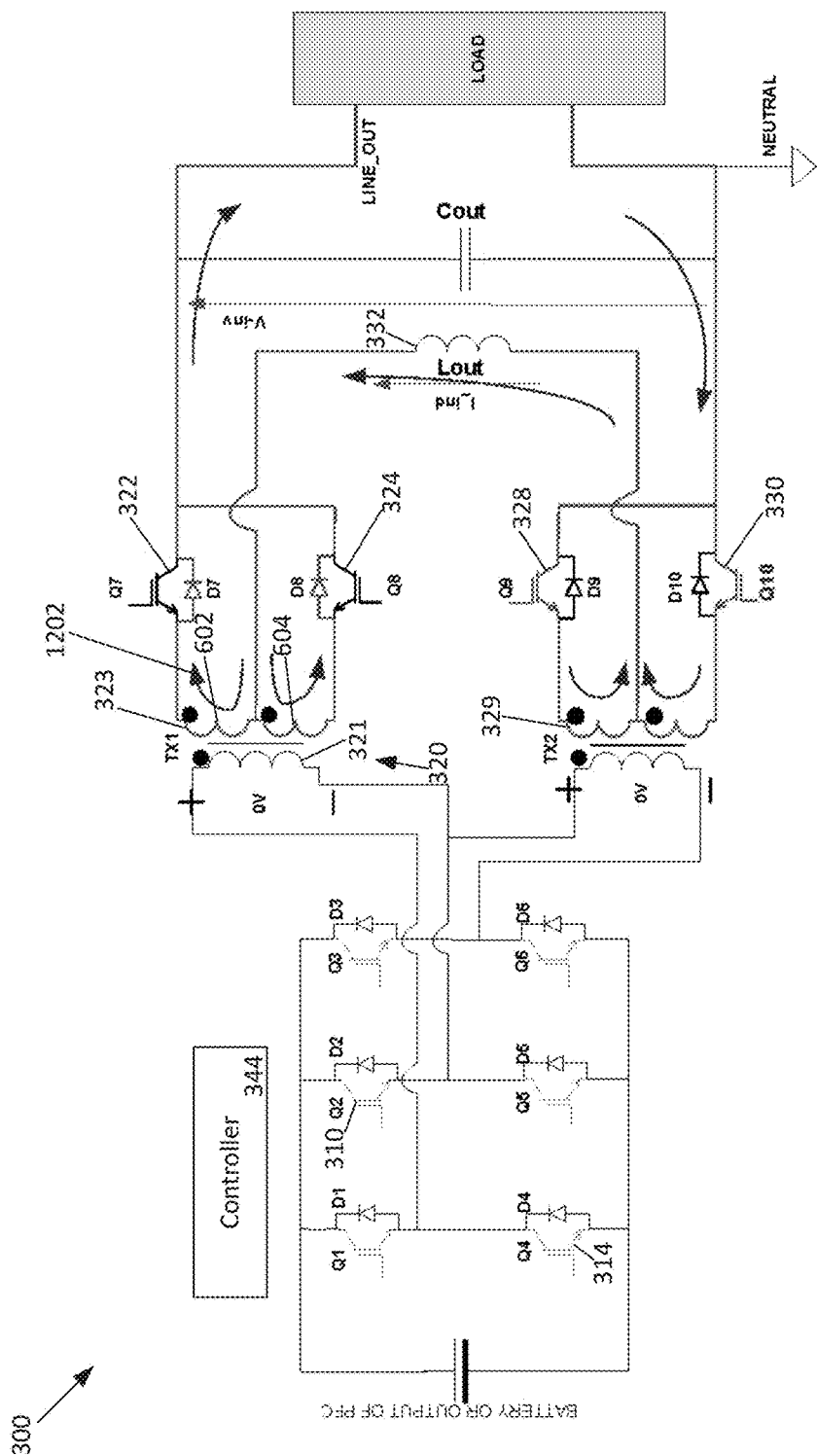
FIG. 12 is a circuit diagram illustrating operation of one embodiment of a DC-AC converter in a second freewheeling state of a real power mode in accordance with aspects of the present invention.

After the second freewheeling-start state of the real power mode, the bidirectional DC-AC converter 300 is operated by the controller 344 in a second freewheeling state. As shown in FIG. 12, in the second freewheeling state, the second switch (Q2) 310 and the fourth switch (Q4) 314 are turned off, inductor current continues to freewheel through the first 602 and second 604 portions of the secondary winding, the diode (D7) of the seventh switch (Q7) 322, and the diode (D8) of the eighth switch (Q8) 324, and the eighth switch (Q8) 324 is turned on. The seventh switch (Q7) 322 is turned on after a dead band period and only conducts current if the current 1202 through the switch 322 is negative (e.g., in response to an inductive load). During this second freewheeling state, the eighth switch (Q8) 324 is on. In the second freewheeling state over the positive half line cycle, the ninth switch (Q9) 328 and the tenth switch (Q10) are closed and flux in the secondary winding 329 is canceled out, as described above.

Figure 13:
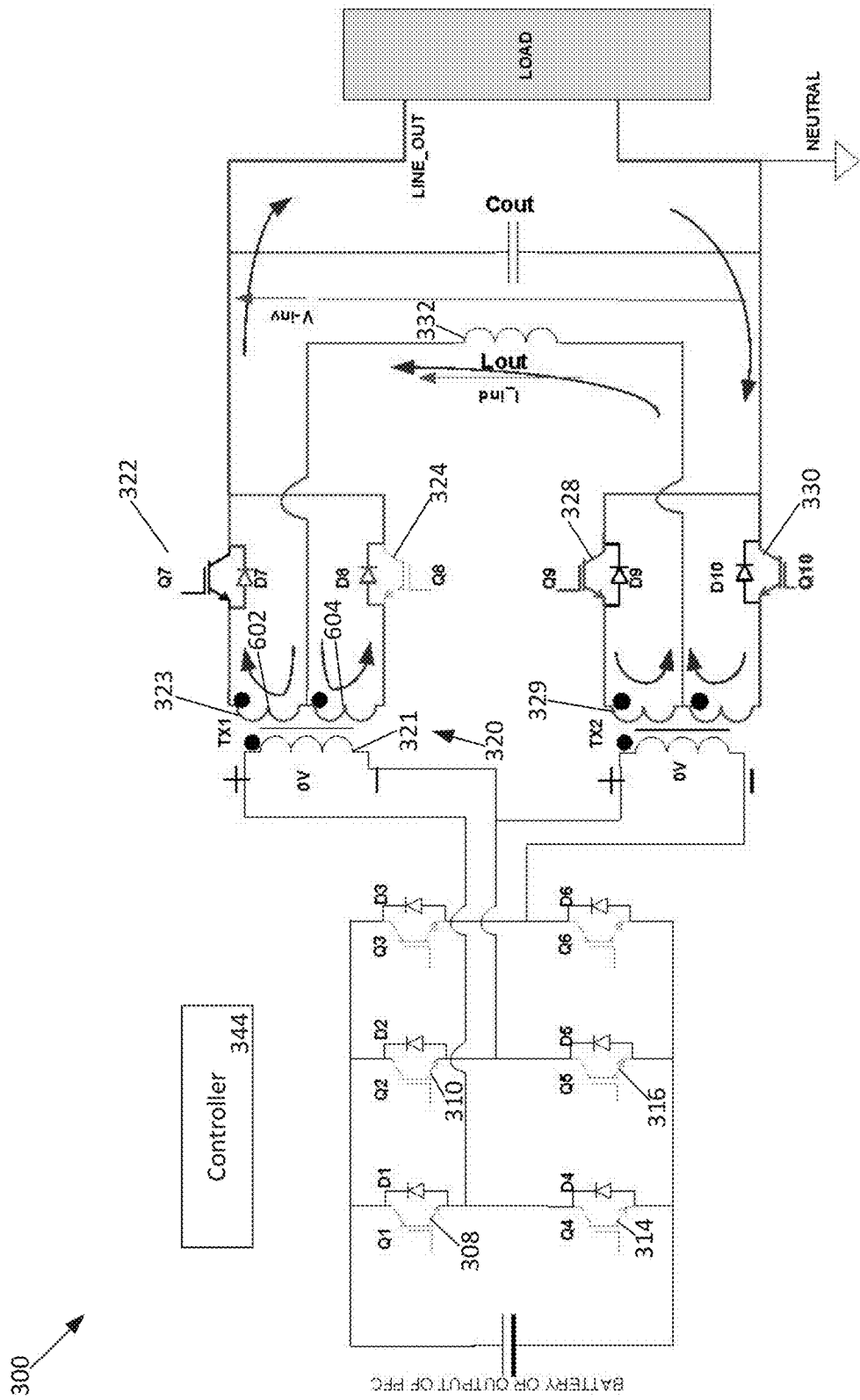
FIG. 13 is a circuit diagram illustrating operation of one embodiment of a DC-AC converter in a second freewheeling-end state of a real power mode in accordance with aspects of the present invention.

After the second freewheeling state of the real power mode, the bidirectional DC-AC converter 300 is operated by the controller 344 in a second freewheeling-end state. As shown in FIG. 13, in the second freewheeling-end state, the eighth switch (Q8) 324 is turned off to enable the turning on of the first switch (Q1) 308 and the fifth switch (Q5) 316 in the next state (i.e., after a dead band), and the freewheeling ends. In the second freewheeling-end state over the positive half line cycle, the ninth switch (Q9) 328 and the tenth switch (Q10) are closed and flux in the secondary winding 329 is canceled out, as described above. After the second freewheeling-end state, the bidirectional DC-AC converter 300 is again operated by the controller 344 in the first charging state, for example, as shown in FIG. 6. Operation of the converter 300 in the real power mode over a positive half cycle is discussed above; however, operation of the converter 300 in the real power mode over a negative half cycle would be substantially the same except that the operation of the switches in the converter 300 would be symmetrical.

Figure 14:
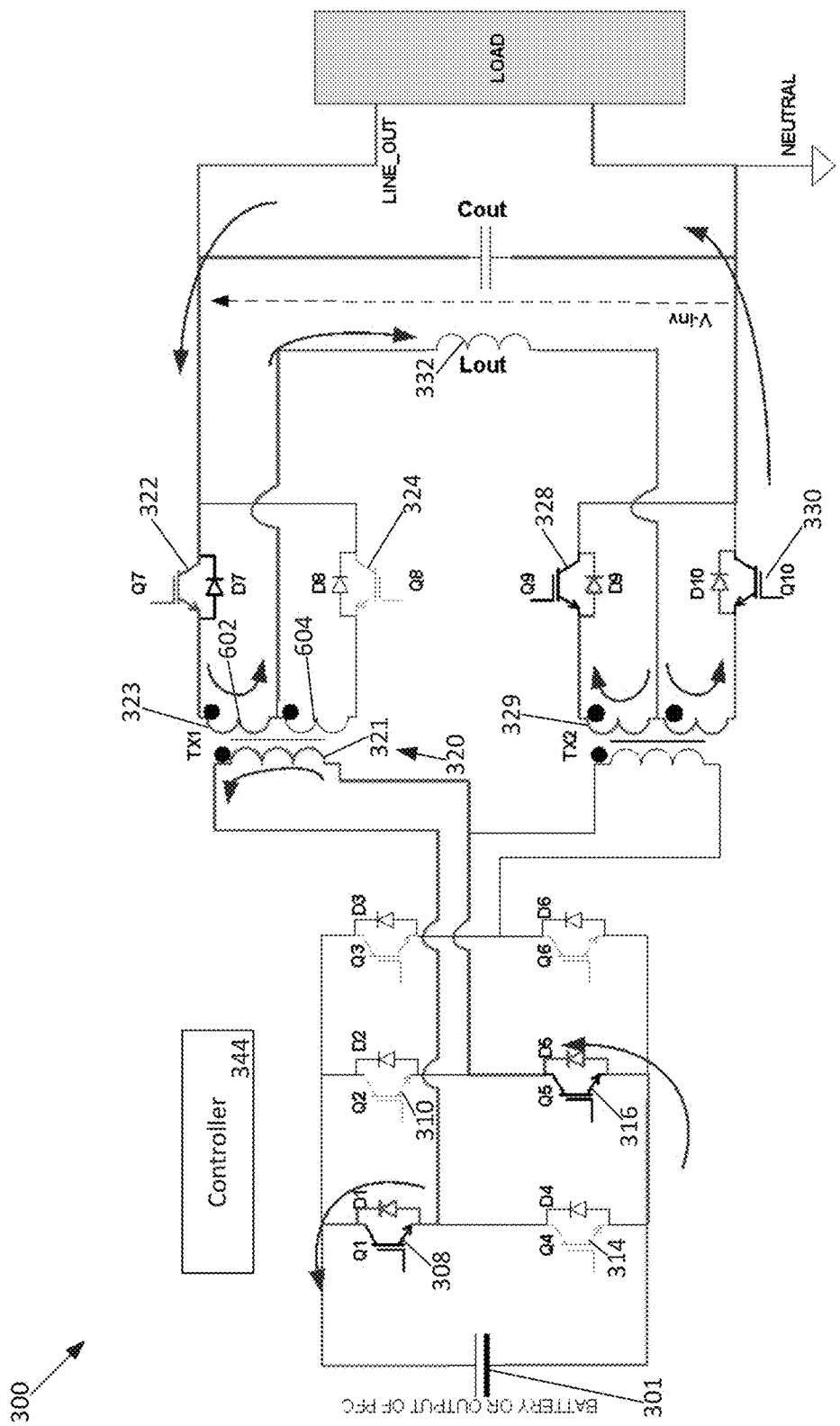
FIG. 14 is a circuit diagram illustrating operation of one embodiment of a DC-AC converter in a first charging state of a reactive power mode in accordance with aspects of the present invention.

According to at least one embodiment, the bidirectional DC-AC converter 300 can also be operated by the controller 344 as a DC-AC inverter to handle reactive power due to a reactive load coupled to the interface 307. Operation of the converter 300 in such a reactive power mode of operation is illustrated in FIGS. 14-21. FIG. 14 is a schematic diagram of the converter 300 illustrating operation of the converter 300 during a first charging state of a reactive power mode over a positive half-cycle. As shown in FIG. 14, in the first charging state, the first switch (Q1) 308, the fifth switch (Q5) 316, and the seventh switch (Q7) 322 are turned on (i.e., closed). As the load current is negative (due to the reactive load), the load current is fed back to the power source 301 as shown in FIG. 14. Also in the first charging state, the ninth switch (Q9) 328 and the tenth switch (Q10) are closed, and the eighth switch (Q8) 324 is opened.

Figure 15:
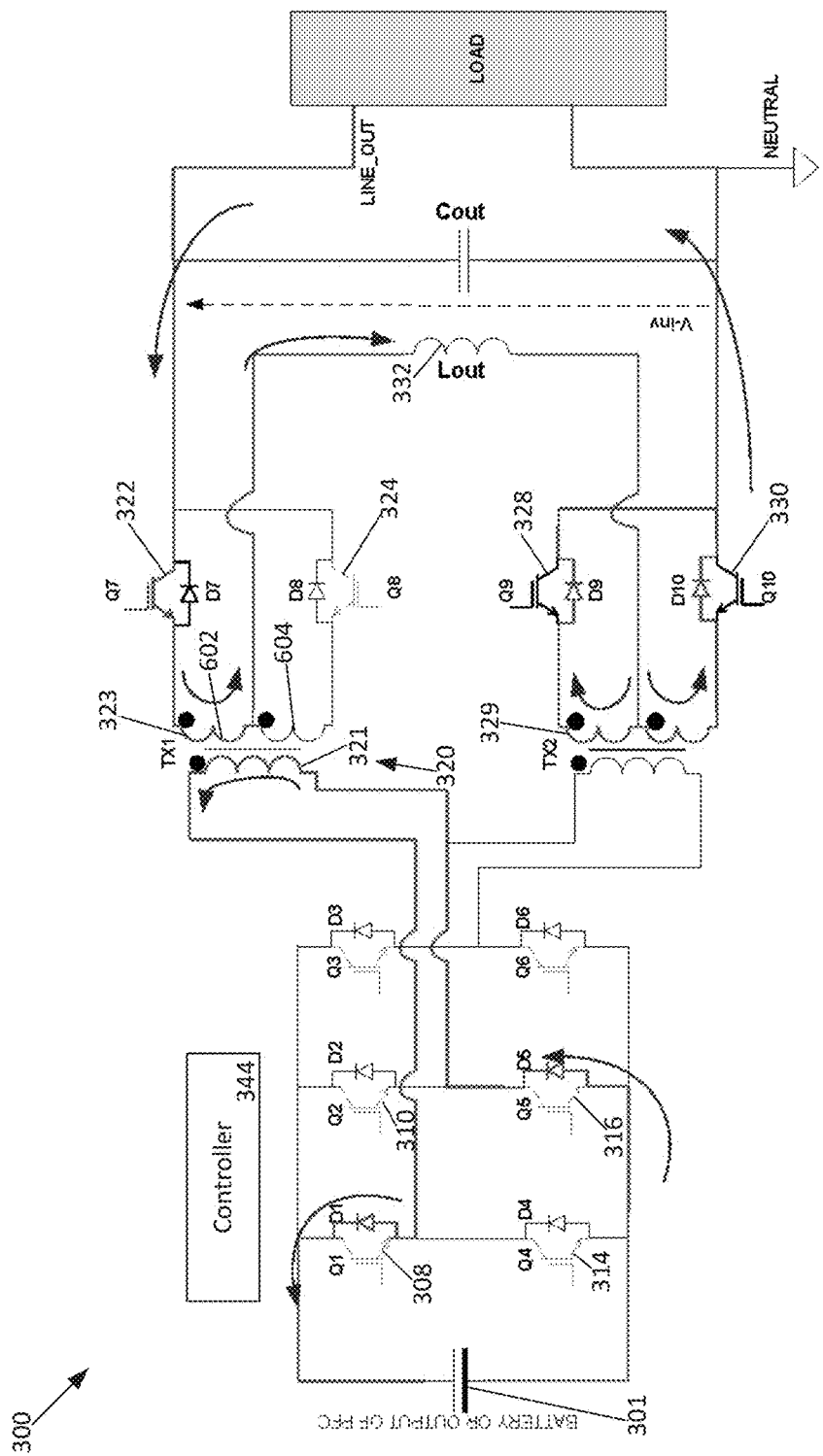
FIG. 15 is a circuit diagram illustrating operation of one embodiment of a DC-AC converter in a first freewheeling-start state of a reactive power mode in accordance with aspects of the present invention.

After the first charging state of the reactive power mode, the controller 344 operates the converter 300 in a first freewheeling-start state. As shown in FIG. 15, in the first freewheeling-start state of the reactive power mode, the first switch (Q1) 308 and the fifth switch (Q5) 316 are turned off (i.e., opened) by the controller 344 and the eighth switch (Q8) 324 remains open (i.e., off). Accordingly, in the first freewheeling-start state, a dead band exists between the eighth switch (Q8) and the first switch (Q1) 308/fifth switch (Q5) 316 and, as the load current is negative (due to the reactive load), no freewheeling occurs in the eighth switch (Q8) 324. Also in the first freewheeling-start state, the ninth switch (Q9) 328 and the tenth switch (Q10) are closed.

Figure 16:
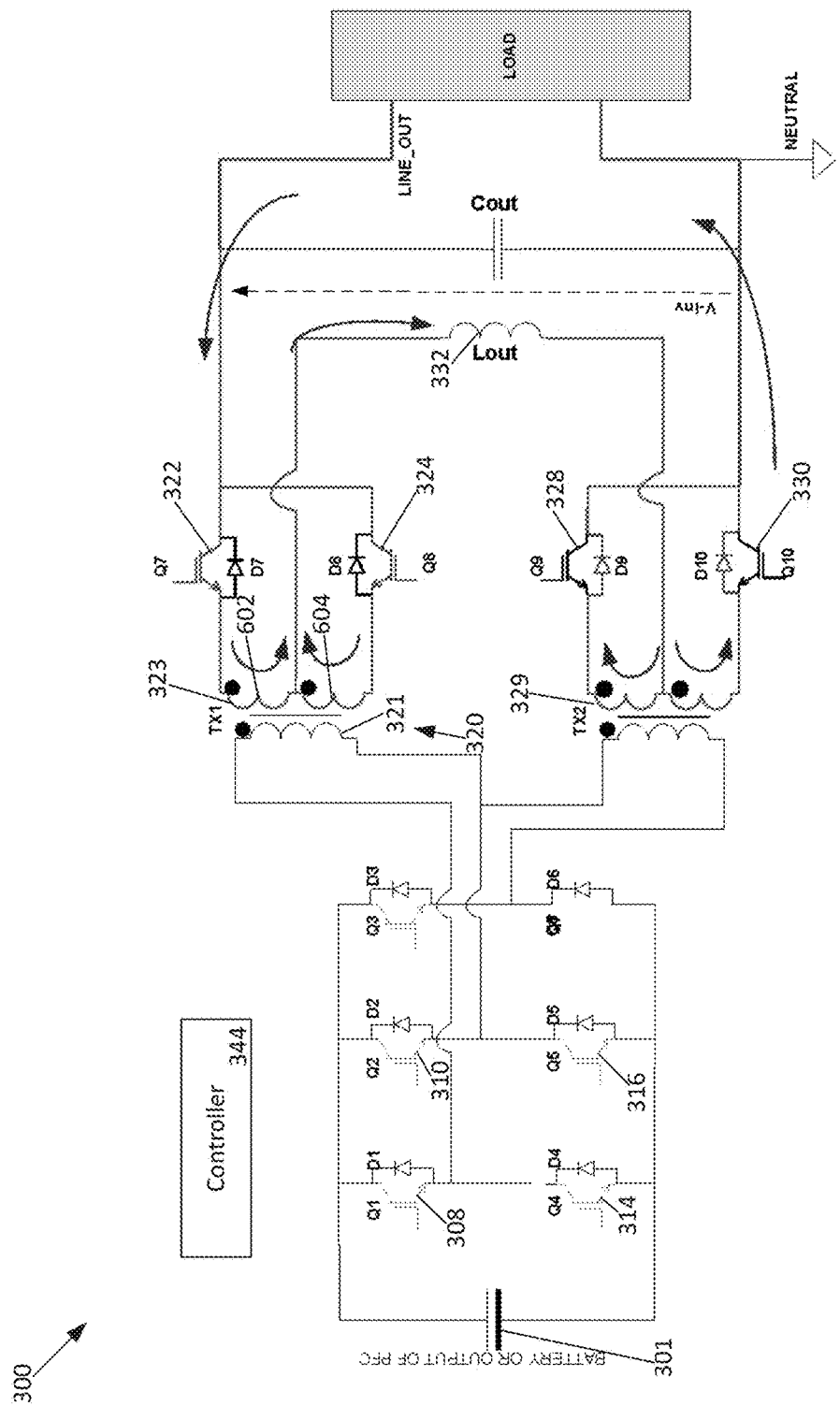
FIG. 16 is a circuit diagram illustrating operation of one embodiment of a DC-AC converter in a first freewheeling state of a reactive power mode in accordance with aspects of the present invention.

After the first freewheeling-start state of the reactive power mode, the controller 344 operates the converter 300 in a first freewheeling state. As shown in FIG. 16, in the first freewheeling state of the reactive power mode, the eighth switch (Q8) 324 is turned on and inductor current freewheels through the seventh switch (Q7) 322, the eighth switch (Q8) 324, and the secondary winding 323 of the first transistor (TX1) 323. After the first freewheeling state of the reactive power mode, the controller 344 operates the converter 300 in a first freewheeling-end state. A shown in FIG. 17, in the first freewheeling-end state of the reactive power mode, the seventh switch (Q7) 322 is turned off (generating a dead band between the seventh switch (Q7) 322 and the second switch (Q2) 310/fourth switch (Q4) 314) and current returns back to the source 301.

Figure 17:
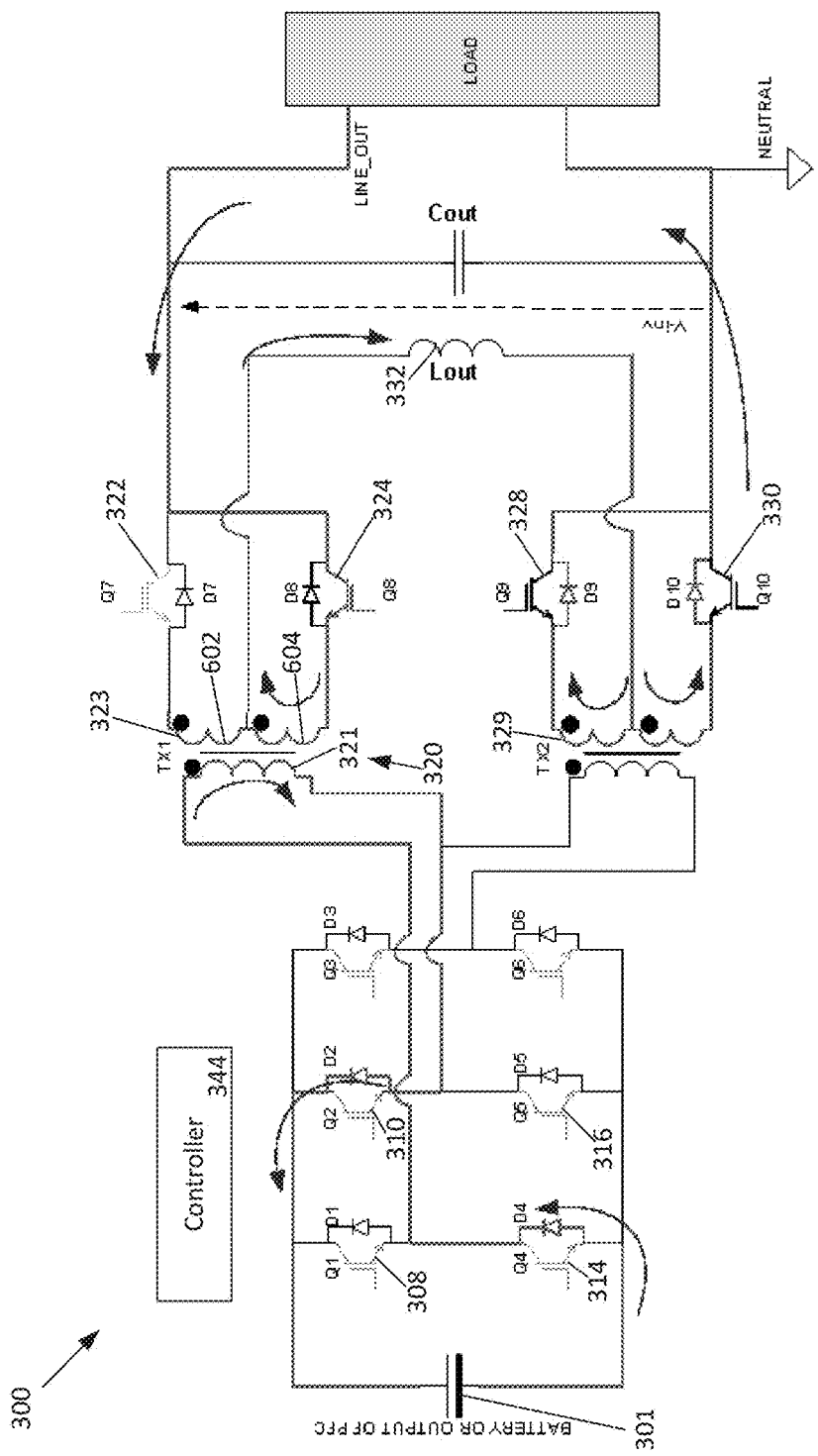
FIG. 17 is a circuit diagram illustrating operation of one embodiment of a DC-AC converter in a first freewheeling-end state of a reactive power mode in accordance with aspects of the present invention.
Figure 18:
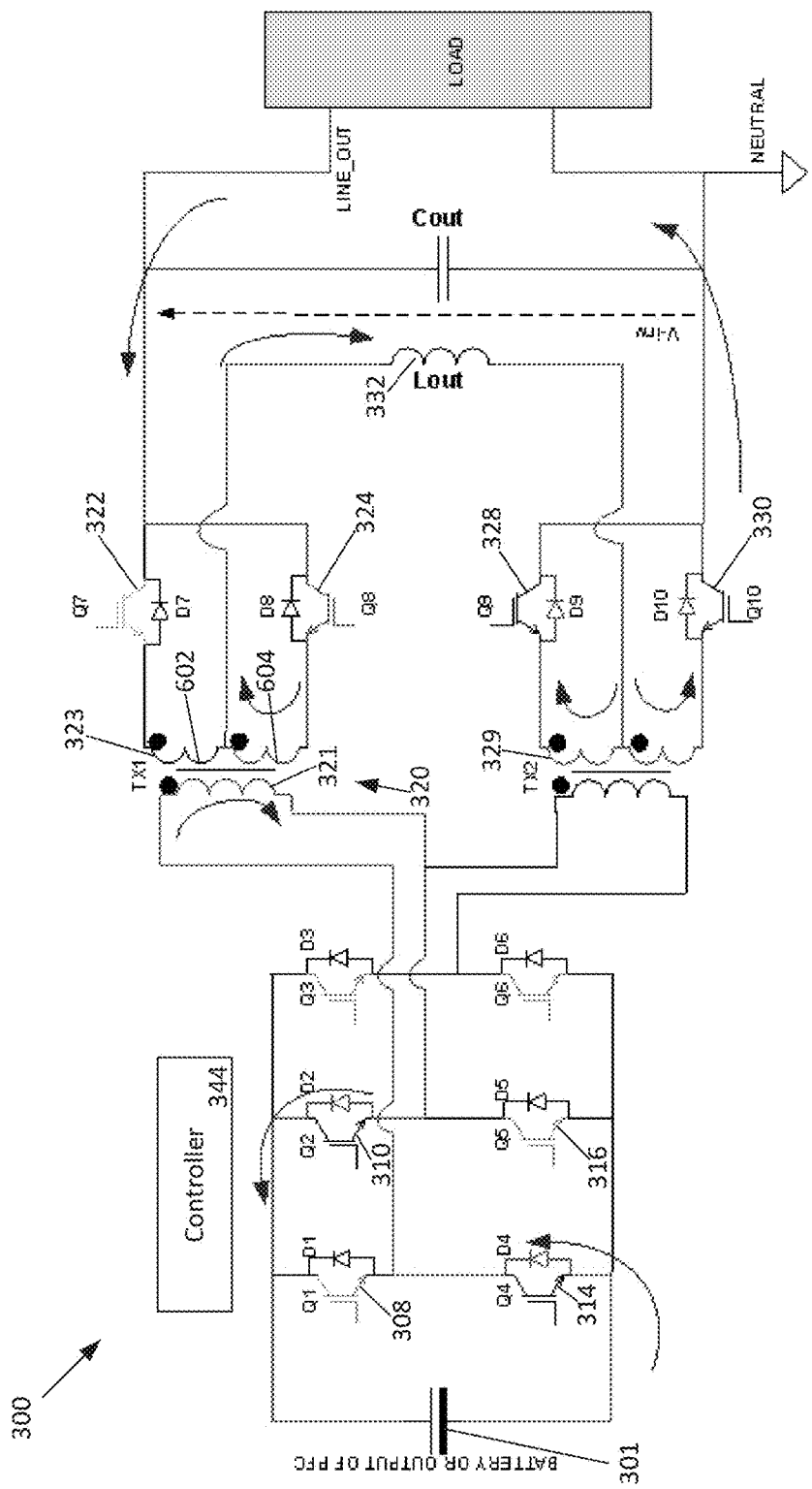
FIG. 18 is a circuit diagram illustrating operation of one embodiment of a DC-AC converter in a second charging state of a reactive power mode in accordance with aspects of the present invention.

After the first freewheeling-end state of the reactive power mode, the controller 344 operates the converter 300 in a second charging state of the reactive power mode. As shown in FIG. 18, in the second charging state of the reactive power mode, the second switch (Q2) 310, the fourth switch (Q4) 314, and the eighth switch (Q8) 324 are turned on (i.e., closed). As the load current is negative (due to the reactive load), the load current is fed back to the power source 301 as shown in FIG. 18 (similarly as shown in FIG. 17). Also in the second charging state, the ninth switch (Q9) 328 and the tenth switch (Q10) are closed, and the seventh switch (Q7) 322 is opened.

Figure 19:
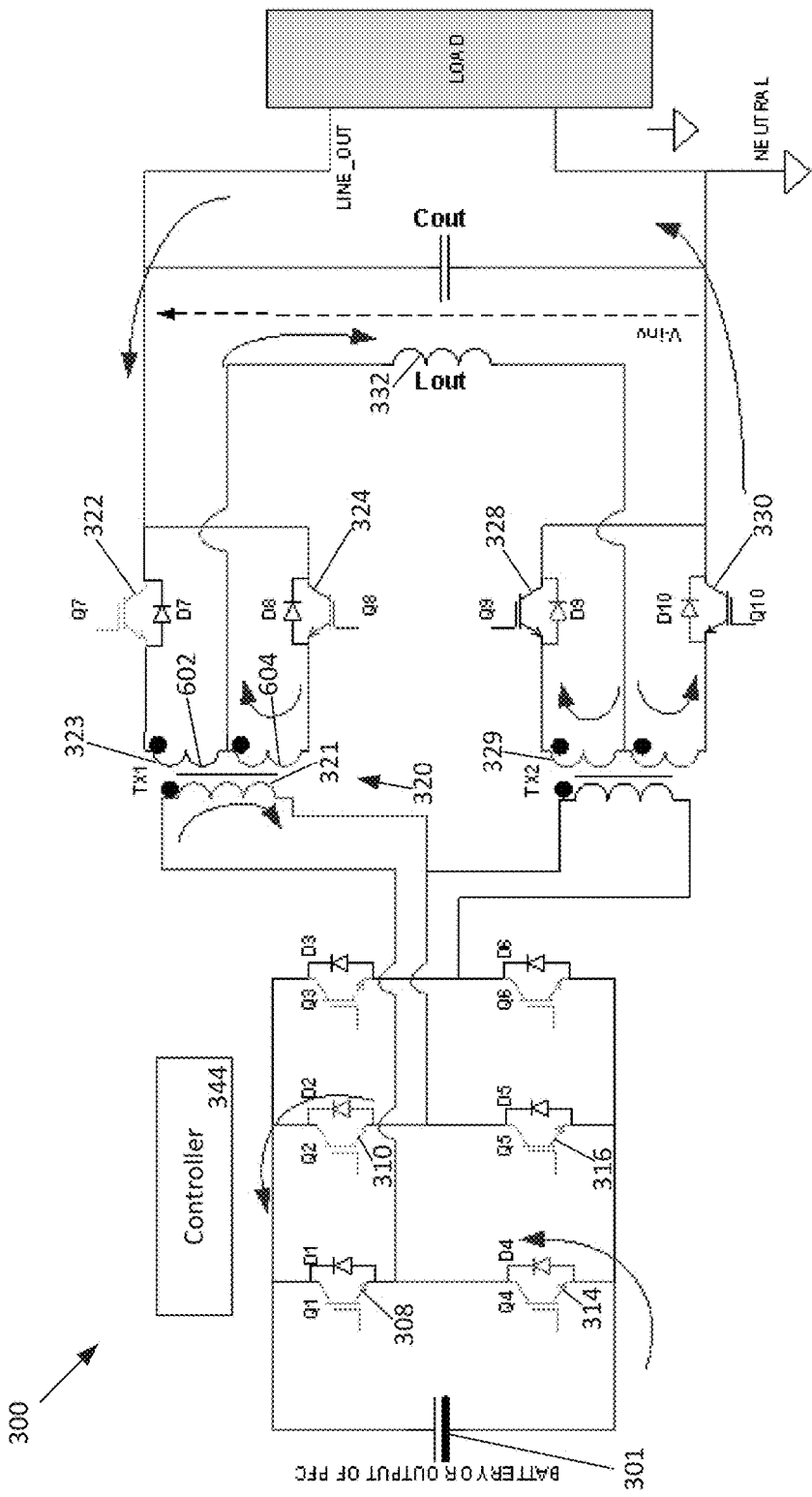
FIG. 19 is a circuit diagram illustrating operation of one embodiment of a DC-AC converter in a second freewheeling-start state of a reactive power mode in accordance with aspects of the present invention.

After the second charging state of the reactive power mode, the controller 344 operates the converter 300 in a second freewheeling-start state. As shown in FIG. 19, in the second freewheeling-start state of the reactive power mode, the second switch (Q2) 310 and the fourth switch (Q4) 314 are turned off (i.e., opened) by the controller 344 and the seventh switch (Q7) 322 remains open (i.e., off). Accordingly, in the second freewheeling-start state of the reactive power mode, a dead band exists between the seventh switch (Q7) 322 and the second switch (Q2) 310/fourth switch (Q4) 314, the load current is fed back to the power source 301 as shown in FIG. 19 (similarly as shown in FIG. 18), and, as the load current is negative (due to the reactive load), no freewheeling occurs in the seventh switch (Q7) 322. Also in the second freewheeling-start state, the ninth switch (Q9) 328 and the tenth switch (Q10) are closed.

Figure 20:
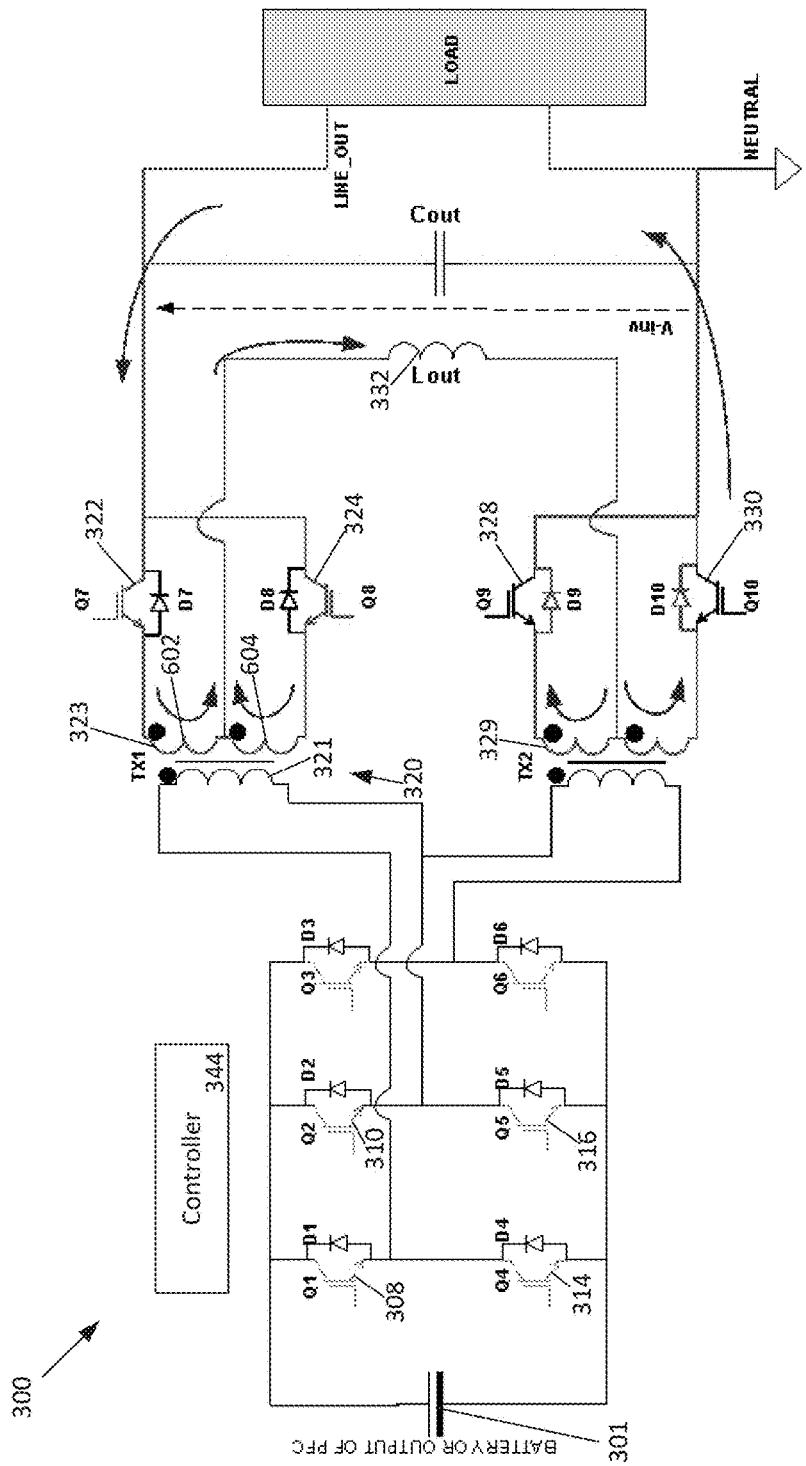
FIG. 20 is a circuit diagram illustrating operation of one embodiment of a DC-AC converter in a second freewheeling state of a reactive power mode in accordance with aspects of the present invention.
Figure 21:
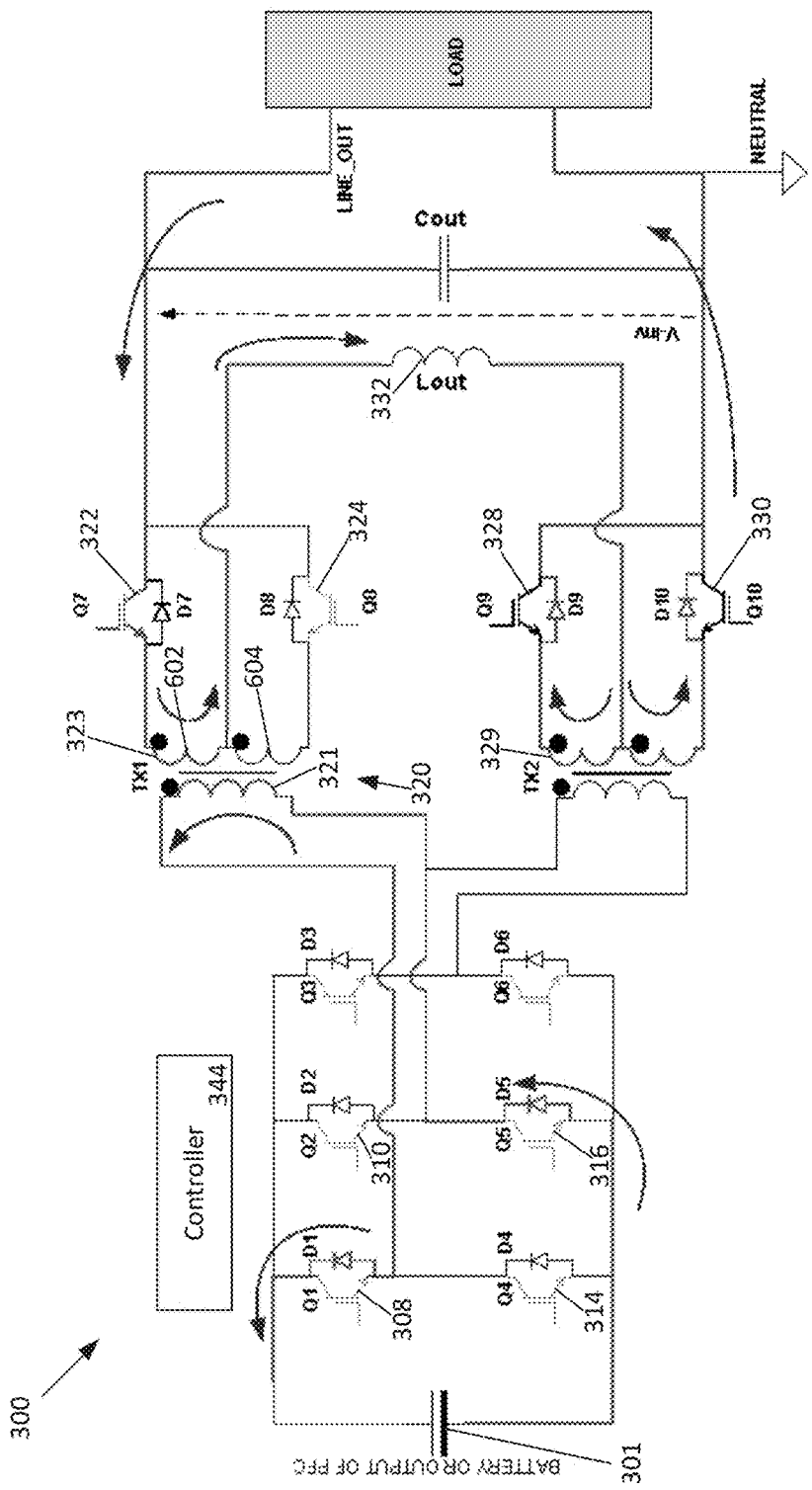
FIG. 21 is a circuit diagram illustrating operation of one embodiment of a DC-AC converter in a second freewheeling-end state of a reactive power mode in accordance with aspects of the present invention.

After the second freewheeling-start state of the reactive power mode, the controller 344 operates the converter 300 in a second freewheeling state. As shown in FIG. 20, in the second freewheeling state of the reactive power mode, the seventh switch (Q7) 322 is turned on and inductor current freewheels through the seventh switch (Q7) 322, the eighth switch (Q8) 324, and the secondary winding 323 of the first transistor (TX1) 323. After the second freewheeling state of the reactive power mode, the controller 344 operates the converter 300 in a second freewheeling-end state. A shown in FIG. 21, in the second freewheeling-end state of the reactive power mode, the eighth switch (Q8) 324 is turned off (generating a dead band between the eighth switch (Q8) 324 and the first switch (Q1) 308/fifth switch (Q5) 316) and current returns back to the source 301. Operation of the converter 300 in the reactive power mode over a positive half cycle is discussed above; however, operation of the converter 300 in the reactive power mode over a negative half cycle would be substantially the same except that the operation of the switches in the converter 300 would be symmetrical.

Figure 22:
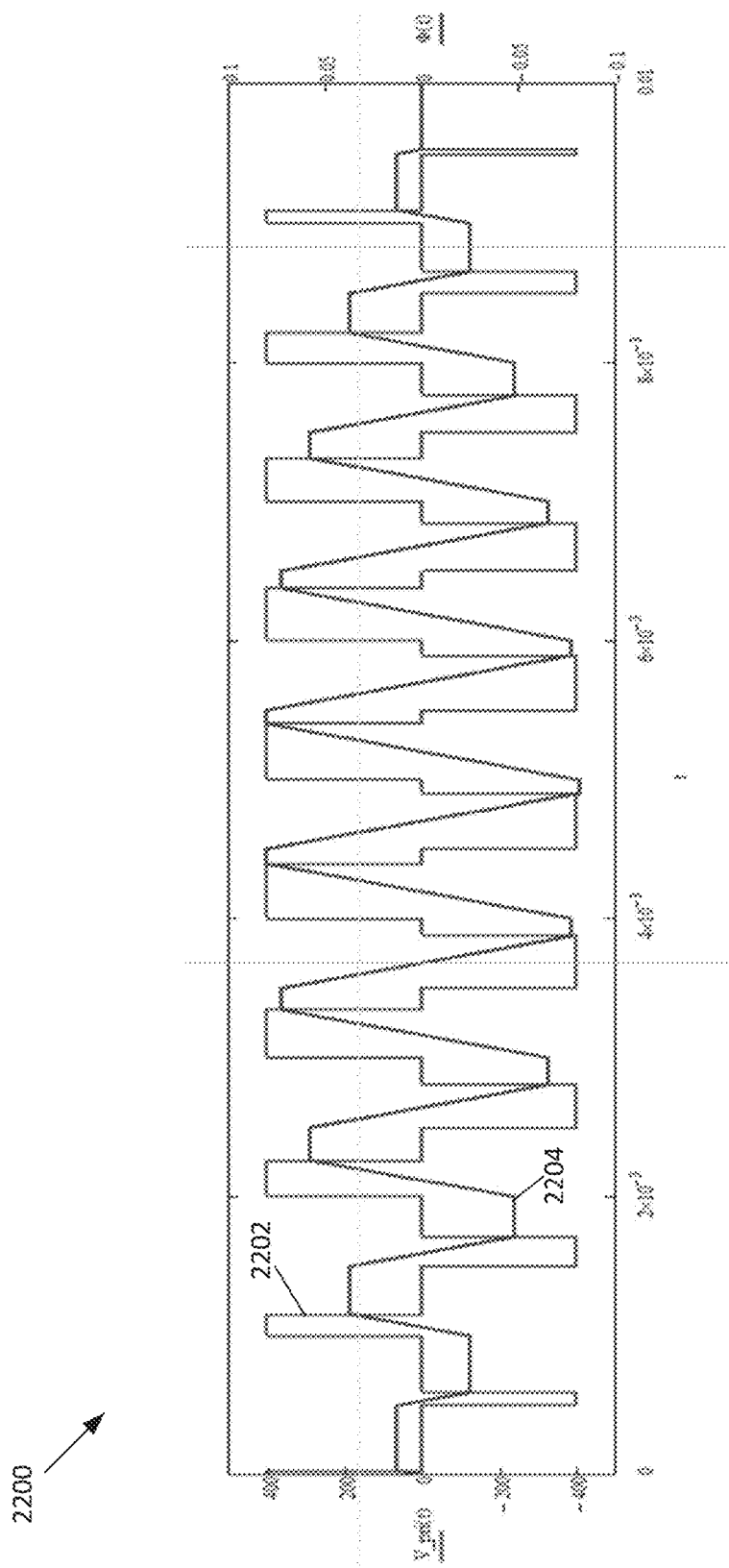
FIG. 22 is a graph illustrating operation of one embodiment of a DC-AC converter in accordance with aspects of the present invention.

According to at least one embodiment, the controller 344 operates the converter 300 to balance flux in the first (TX1) and second (TX2) transformers 320, 326 while operating as a high frequency isolated converter. More specifically, the controller 344 operates the DC-DC bridge 302 such that the voltage across the primary winding 321, 327 of each transformer 320, 326 alternates like a full bridge DC-DC converter. However, the controller 344 further operates the DC-DC bridge 302 such that each pulse provided to a primary winding 321, 327 progressively increases up to a peak value (i.e., a peak of a sine wave from zero) and then progressively decreases back to zero (i.e., in the pattern of sine PWM). For example, FIG. 22 is a graph illustrating pulses 2202 provided to the primary winding of a transformer (with sine PWM) with respect to flux 2204 in the transformer. As shown in FIG. 22, each pulse 2202 increases the flux 2204 in the transformer to a higher level from the previous pulse, but in an opposite direction, up to a peak of a sine wave. The maximum flux build-up occurs at the peak of a sine wave, which is equal to the voltage across the primary winding multiplied by the duty cycle of the pulse 2202. Such operation of the converter 300 corresponds to operation as a pure isolated full bridge DC-DC converter.

Figure 23:
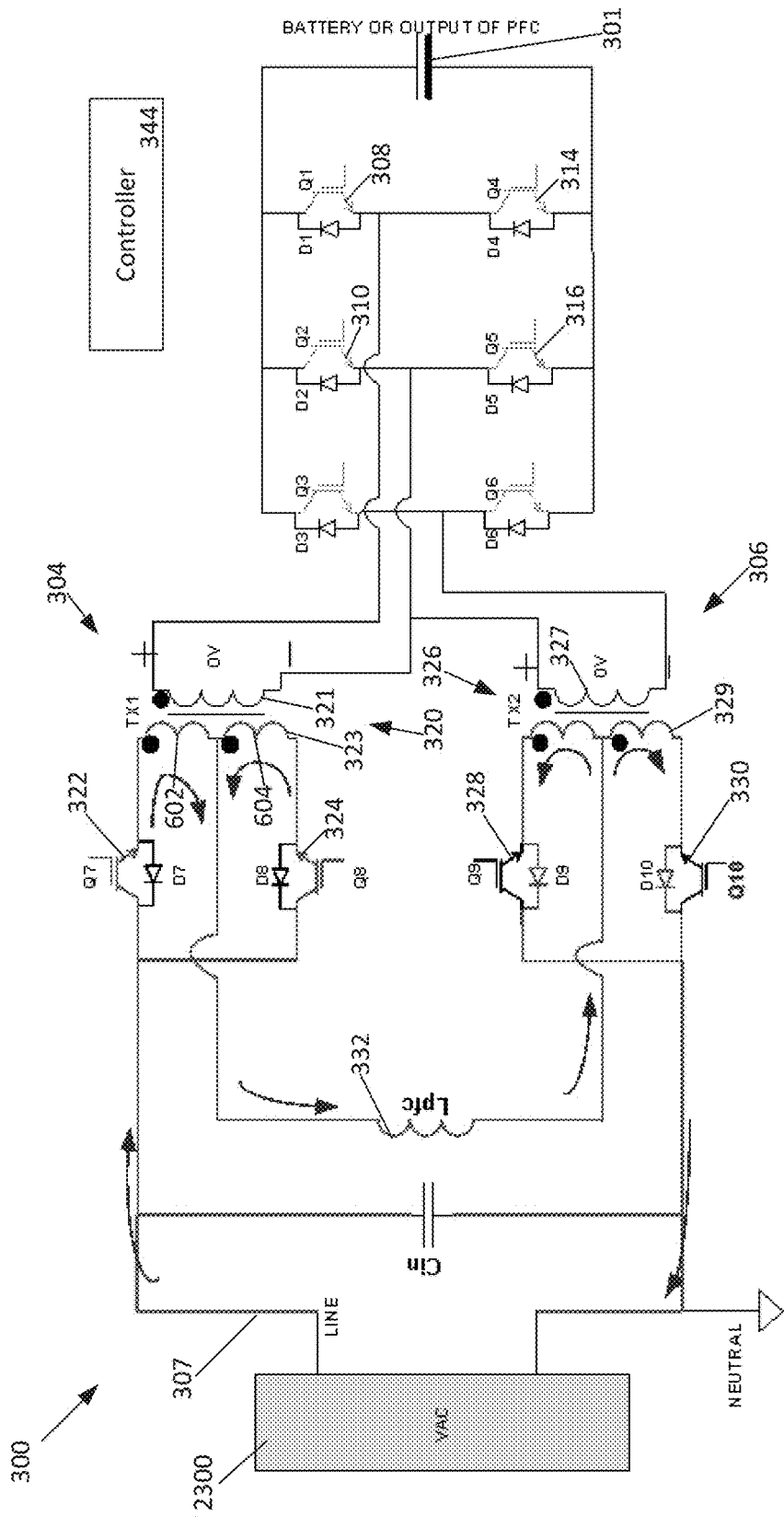
FIG. 23 is a circuit diagram illustrating operation of one embodiment of a DC-AC converter in a first inductor charging state of a charging mode in accordance with aspects of the present invention.

According to at least one embodiment, the bidirectional DC-AC converter 300 can also be operated by the controller 344 as a boost converter in a charging mode to charge the DC source 301 from received AC power. Operation of the converter 300 in such a charging mode of operation is illustrated in FIGS. 23-30. FIG. 23 is a schematic diagram of the converter 300 illustrating operation of the converter 300 during a first inductor charging state of the charging mode over a positive half-cycle. As shown in FIG. 23, in the first inductor charging state of the charging mode, the seventh switch (Q7) 322, eighth switch (Q8) 324, ninth switch (Q9) 328, and tenth switch (Q10) are closed. As shown in FIG. 23, when an AC voltage source 2300 is coupled to the interface 307, the source 2300 provides an input voltage (Vin) to the interface 307, the voltage across each transformer 320, 326 is zero and the voltage across the inductor (Lout) 332 is the same as the input voltage (Vin) and energy is stored in the inductor 332.

Figure 24:
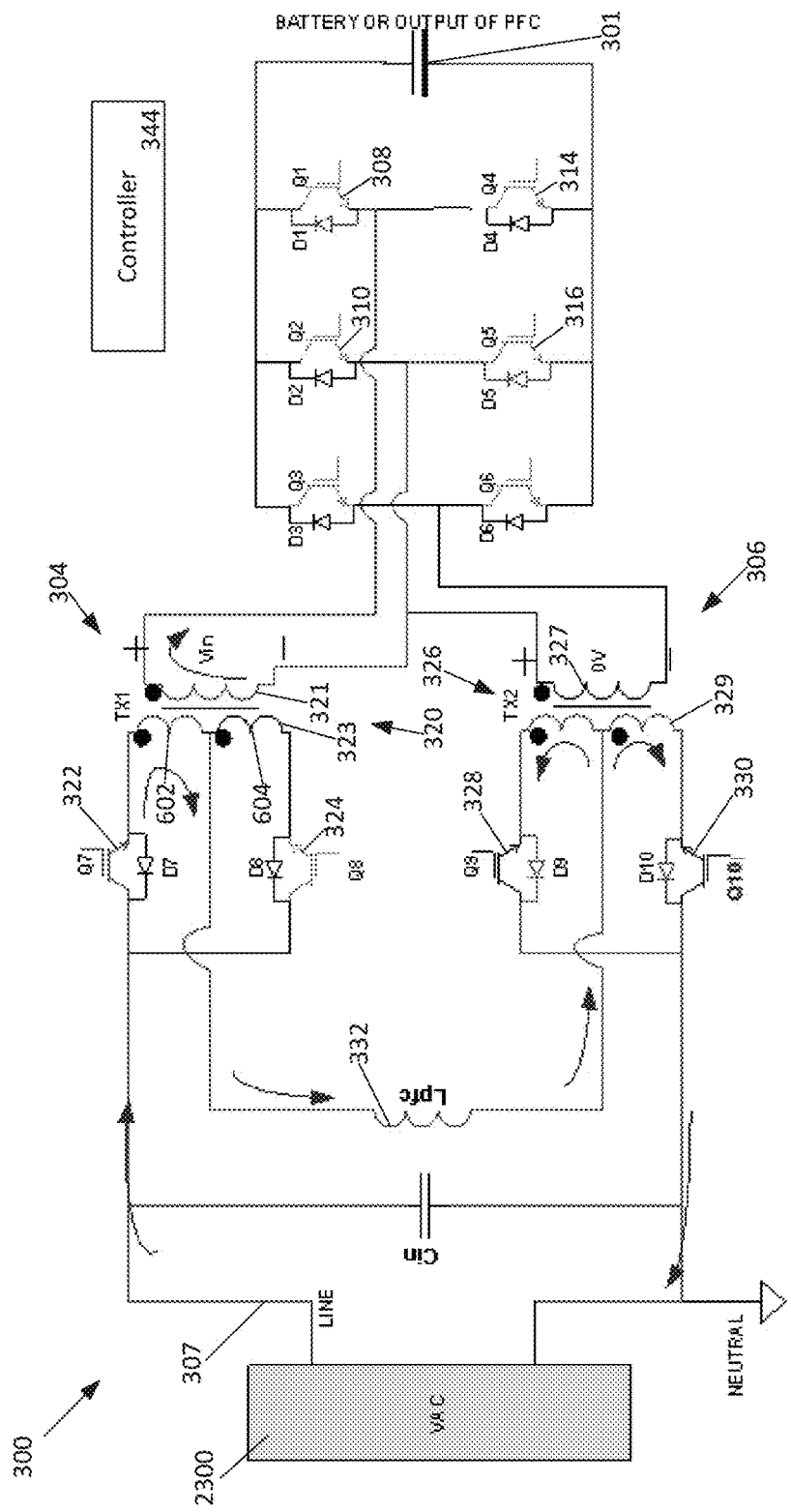
FIG. 24 is a circuit diagram illustrating operation of one embodiment of a DC-AC converter in a first energy transfer state of a charging mode in accordance with aspects of the present invention.
Figure 25:
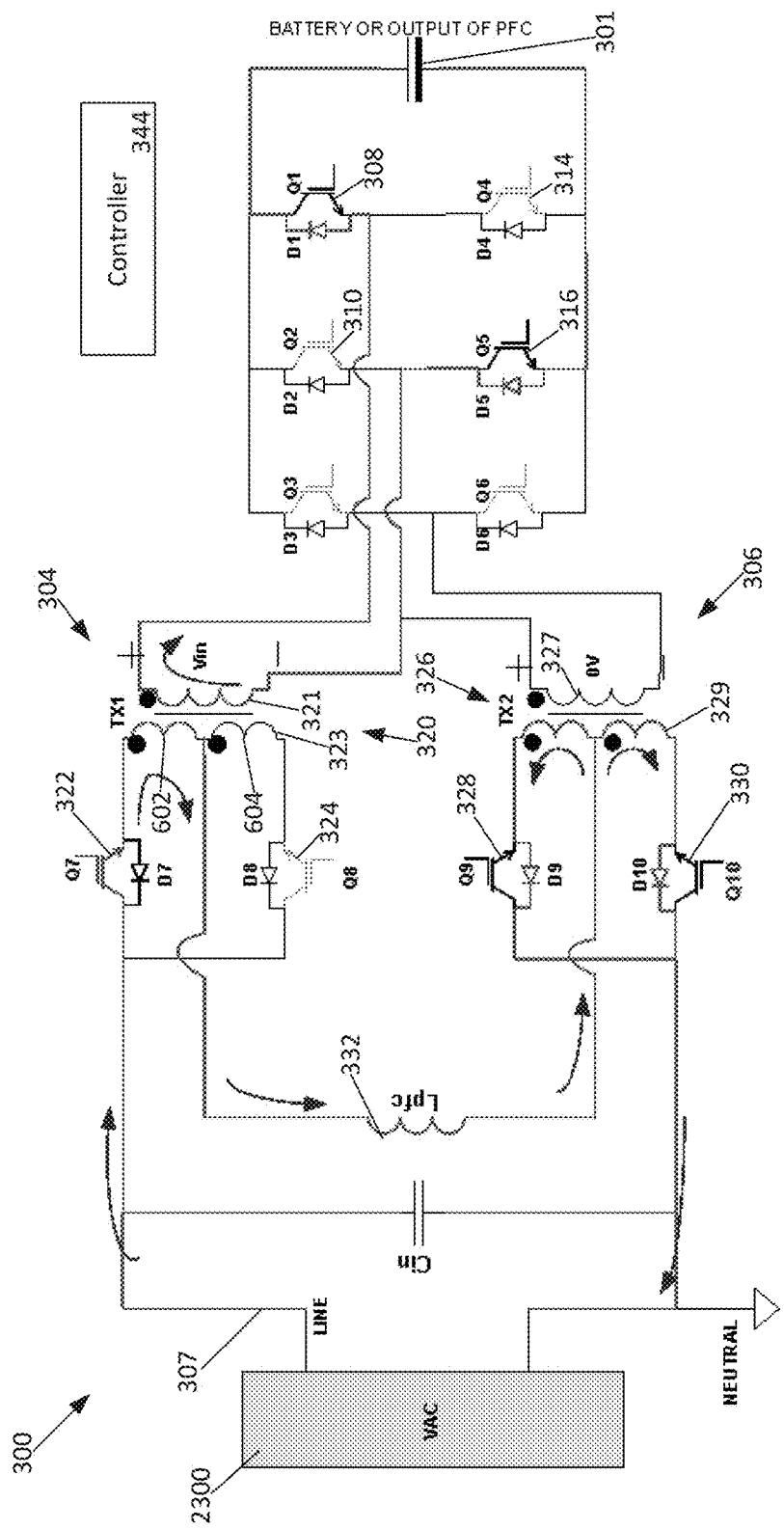
FIG. 25 is a circuit diagram illustrating operation of one embodiment of a DC-AC converter in a first energy transfer state of a charging mode in accordance with aspects of the present invention.

After the first inductor charging state of the charging mode, the controller 344 operates the converter 300 in a first energy transfer state. As shown in FIG. 24, in the first energy transfer state, the eighth switch (Q8) 324 is turned off. Once the eighth switch (Q8) 324 is turned off in the first energy transfer state, energy previously stored in the inductor 332 is transferred to the DC source 301 via the first transformer (TX1) 320, the diode D1 of the first switch (Q1) 308, and the diode D5 of the fifth switch (Q5) 316. In such a state, the voltage across the secondary winding 321 of the first transformer (TX1) is the positive input voltage (Vin). According to one embodiment as shown in FIG. 25, in the first energy transfer state after a dead band period, the first switch (Q1) 308 and the fifth switch (Q5) 316 are turned on (i.e., closed) due to common gate drive logic in the real or reactive power modes. After the first switch (Q1) 308 and the fifth switch (Q5) 316 are turned on, energy transfer between the inductor 332 and the DC source 301 can continue. In such an embodiment, the first switch (Q1) 308 and the fifth switch (Q5) 316 are turned off (e.g., as shown in FIG. 24) before the end of the first energy transfer state (i.e., before the eighth switch (Q8) 324 is again turned on).

Figure 26:
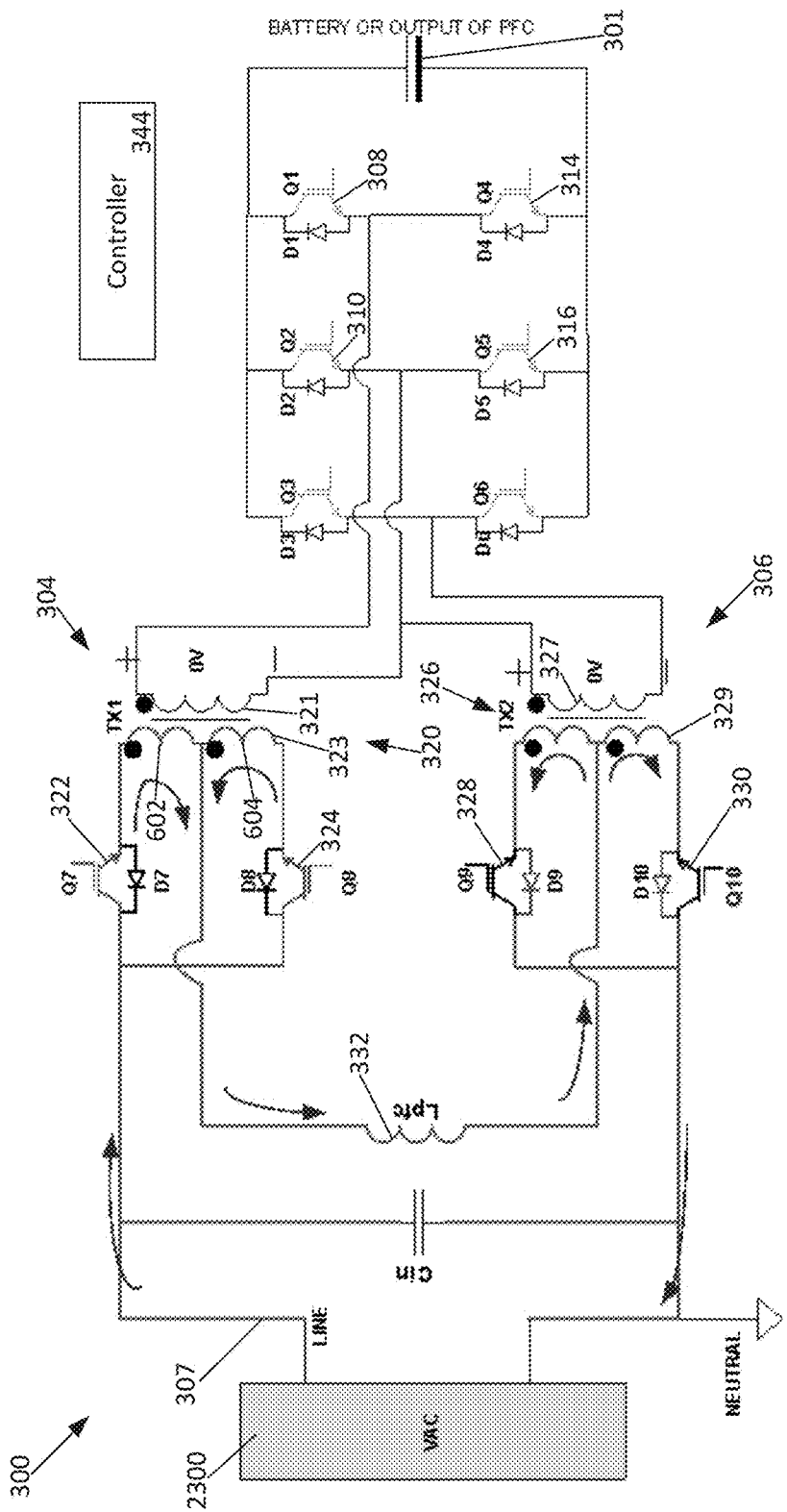
FIG. 26 is a circuit diagram illustrating operation of one embodiment of a DC-AC converter in a second inductor charging state of a charging mode in accordance with aspects of the present invention.

After the first energy transfer state, the controller 344 operates the converter 300 in a second inductor charging state of the charging mode over a positive half-cycle. As shown in FIG. 26, in the second inductor charging state, the eighth switch (Q8) 324 is turned on (e.g., after the first switch (Q1) 308 and the fifth switch (Q5) 316 are turned off as discussed above), and inductor current rises again, resulting in zero voltage across the transformers 320, 326 and the input voltage (Vin) across the inductor 332.

Figure 27:
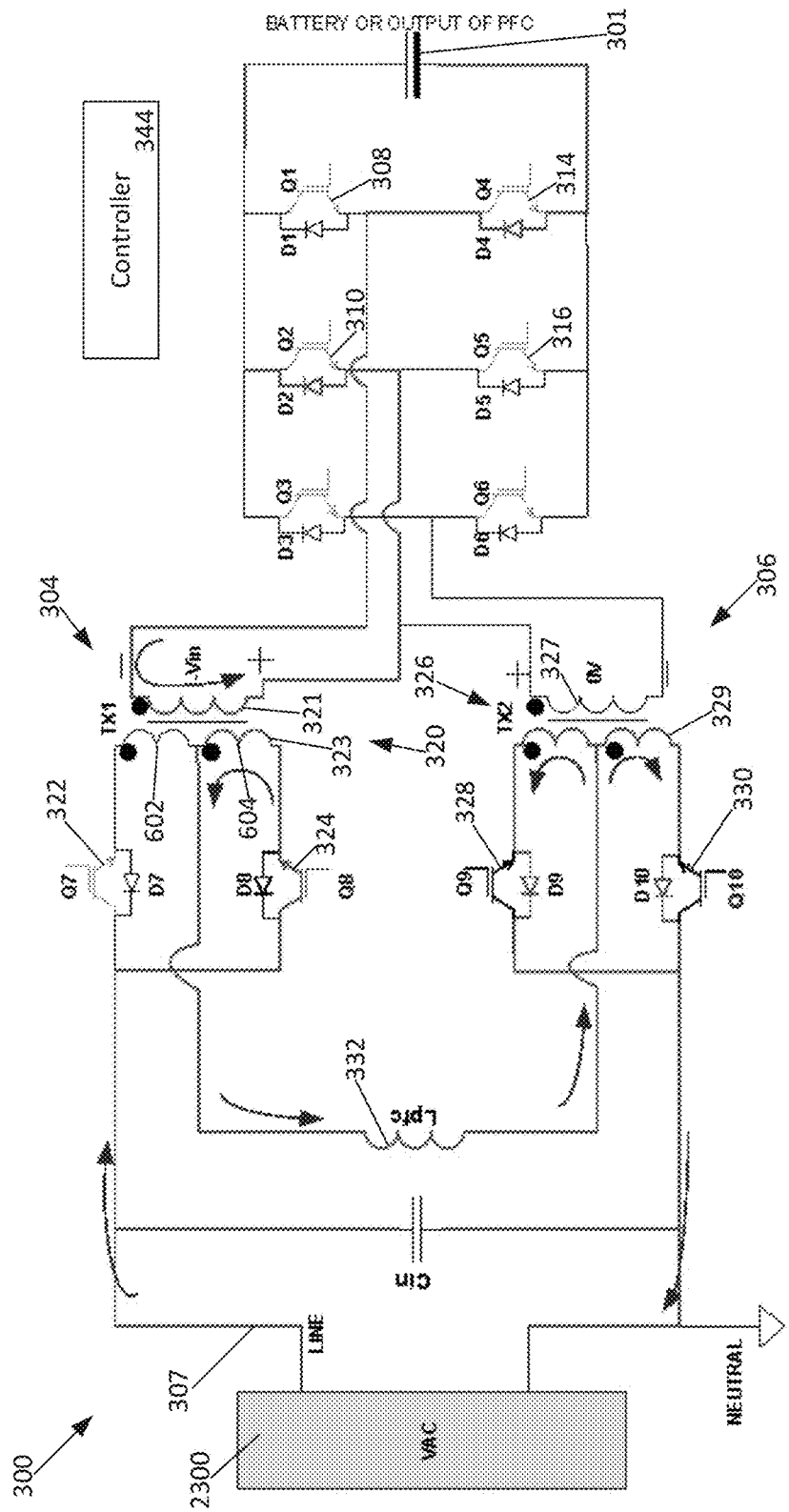
FIG. 27 is a circuit diagram illustrating operation of one embodiment of a DC-AC converter in a second energy transfer state of a charging mode in accordance with aspects of the present invention.
Figure 28:
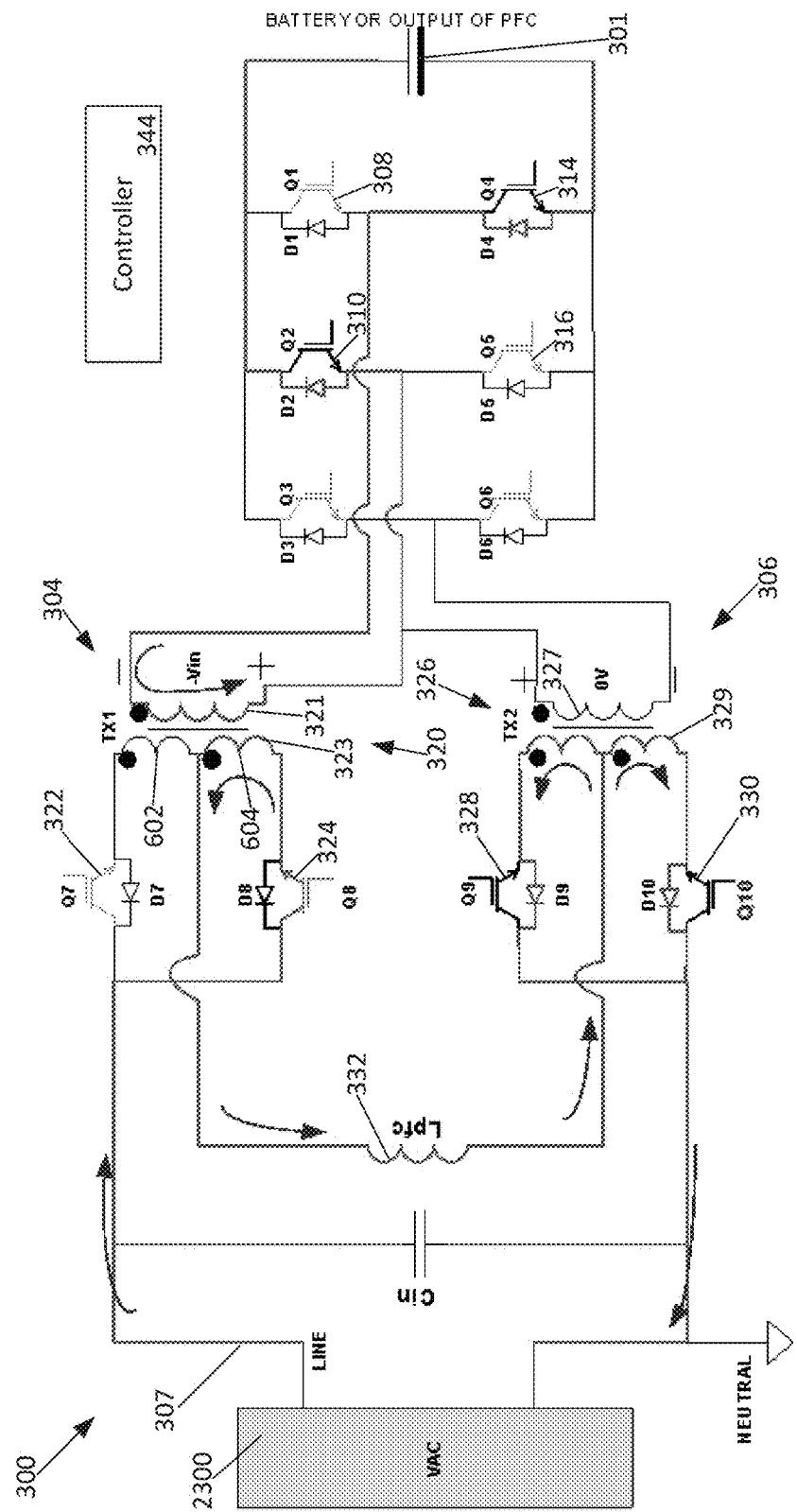
FIG. 28 is a circuit diagram illustrating operation of one embodiment of a DC-AC converter in a second energy transfer state of a charging mode in accordance with aspects of the present invention.

After the second inductor charging state of the charging mode, the controller 344 operates the converter 300 in a second energy transfer state. As shown in FIG. 27, in the second energy transfer state, the seventh switch (Q7) 322 is turned off. Once the seventh switch (Q7) 322 is turned off in the second energy transfer state, energy previously stored in the inductor 332 is transferred to the DC source 301 via the first transformer (TX1) 320, the diode D2 of the second switch (Q2) 310, and the diode D4 of the fourth switch (Q4) 314. In such a state, the voltage across the secondary winding 321 of the first transformer (TX1) is the negative input voltage (−Vin) (i.e., to compensate for the positive input voltage generated during the first energy transfer state). According to one embodiment as shown in FIG. 28, in the second energy transfer state after a dead band period, the second switch (Q2) 310 and the fourth switch (Q4) 314 are turned on (i.e., closed) due to common gate drive logic in the real or reactive power modes. After the second switch (Q2) 310 and the fourth switch (Q4) 314 are turned on, energy transfer between the inductor 332 and the DC source 301 can continue. In such an embodiment, the second switch (Q2) 310 and the fourth switch (Q4) 314 are turned off (e.g., as shown in FIG. 27) before the end of the second energy transfer state (i.e., before the seventh switch (Q7) 322 is again turned on).

After the second energy transfer state, the seventh switch (Q7) 322 is turned on and the states of the charging mode over the positive half cycle are repeated. Operation of the converter 300 in the charging mode over a positive half cycle is discussed above; however, operation of the converter 300 in the charging mode over a negative half cycle would be substantially the same except that the operation of the switches in the converter 300 would be symmetrical.

Figure 29:
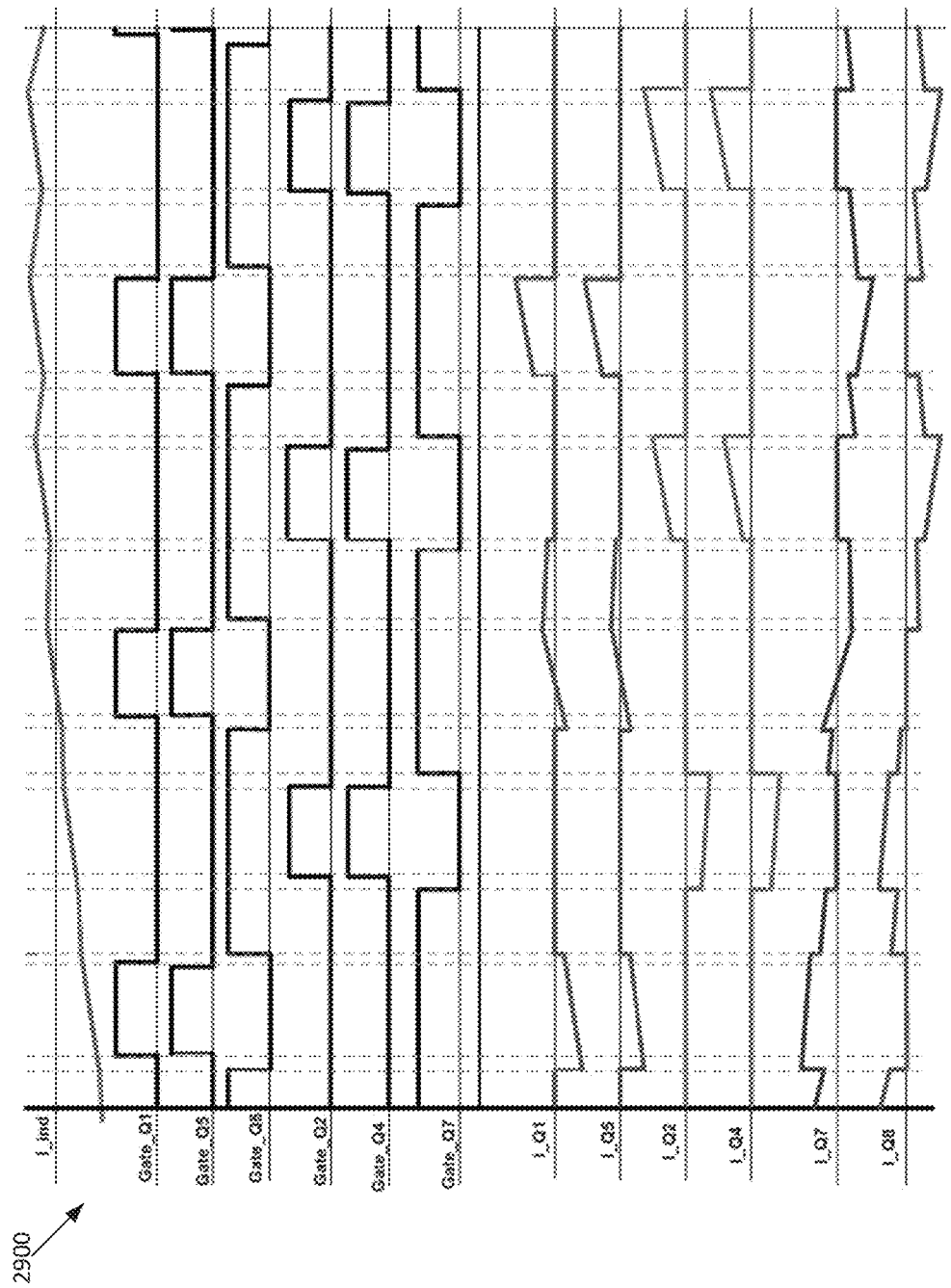
FIG. 29 is a graph illustrating operation of one embodiment of a DC-AC converter in accordance with aspects of the present invention.

One example switching pattern of the converter 300 over a positive half cycle is shown in the graph 2900 illustrated in FIG. 29. Over the positive half cycle, the controller 344 operates the first switch (Q1) 308, the second switch (Q2) 310, the fourth switch (Q4) 314, the fifth switch (Q5) 316, the seventh switch (Q7) 322, and the eighth switch (Q8) 324 to operate as described above, the third switch (Q3) 312 and sixth switch (Q6) 318 to remain off, and the ninth switch (Q9) 328 and tenth switch (Q10) 330 to remain on. The graph 2900 also illustrates current through the switches 308, 316, 310, 314, 322, 324 and inductor 332 of the converter 300 over the positive half cycle.

When compared to a conventional DC-AC converter (e.g., as shown in FIGS. 1-2), the DC-AC bidirectional converter described above can be less expensive, more efficient, and does not require the use of an electrolytic capacitor. More specifically, the DC-AC bidirectional converter described above does not include an intermediate energy storage section (e.g., as shown in the conventional DC-AC converter of FIG. 2 including an inductor, switches and bulk capacitor). The total cost of a typical intermediate energy storage section can be relatively high and such an intermediate energy storage section can increase power losses of the converter. In addition, by switching the inductor 332 at a relatively high rate, the size, cost, and losses of the inductor 332 can further be reduced.

Figure 30:
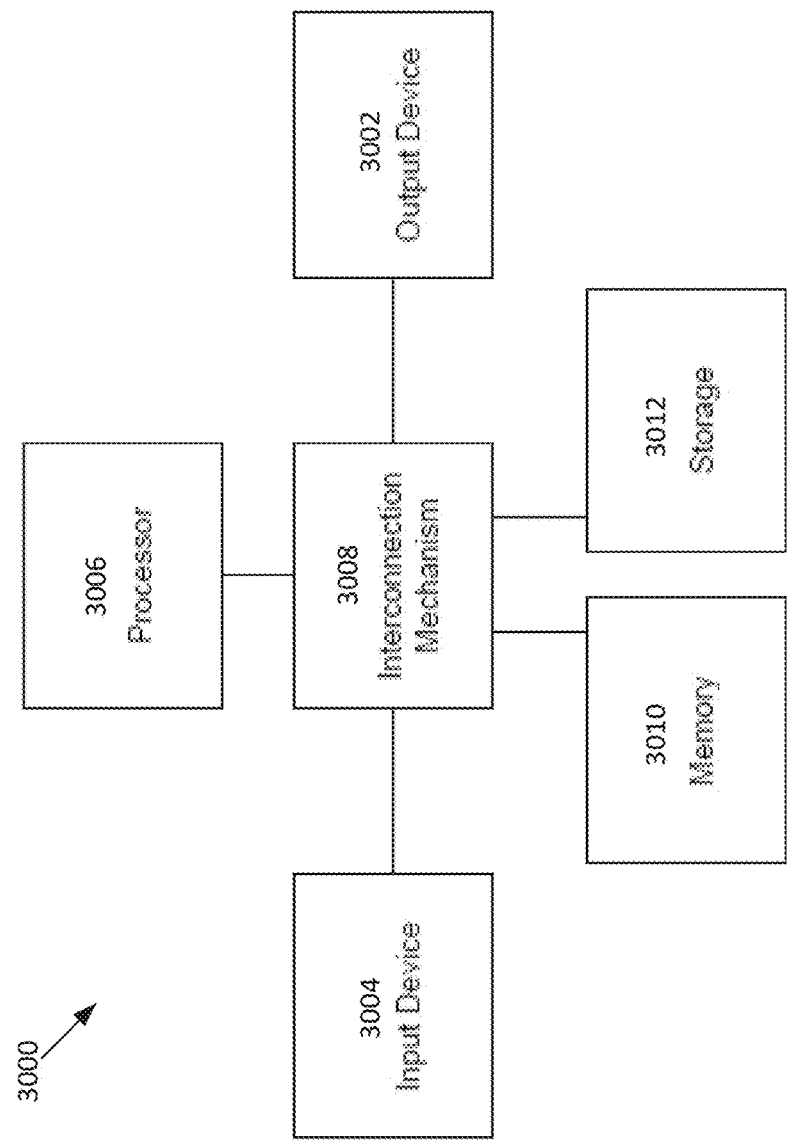
FIG. 30 is a block diagram of a system upon which various embodiments of the invention may be implemented.

FIG. 30 illustrates an example block diagram of computing components forming a system 3000 which may be configured to implement one or more aspects disclosed herein. For example, the system 3000 may be communicatively coupled to the controller 344 or included within the controller 344. The system 3000 may also be configured to operate a bidirectional converter as discussed above.

The system 3000 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 3000 may include specially-programmed, special-purpose hardware, for example, an application-specific integrated circuit (ASIC). Various aspects of the present disclosure may be implemented as specialized software executing on the system 3000 such as that shown in FIG. 30.

The system 3000 may include a processor/ASIC 3006 connected to one or more memory devices 3010, such as a disk drive, memory, flash memory or other device for storing data. Memory 3010 may be used for storing programs and data during operation of the system 3000. Components of the computer system 3000 may be coupled by an interconnection mechanism 3008, which may include one or more buses (e.g., between components that are integrated within a same machine) and/or a network (e.g., between components that reside on separate machines). The interconnection mechanism 3008 enables communications (e.g., data, instructions) to be exchanged between components of the system 3000. The system 3000 also includes one or more input devices 3004, which may include for example, a keyboard or a touch screen. The system 3000 includes one or more output devices 3002, which may include for example a display. In addition, the computer system 3000 may contain one or more interfaces (not shown) that may connect the computer system 3000 to a communication network, in addition or as an alternative to the interconnection mechanism 3008.

The system 3000 may include a storage system 3012, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 3010 that allows for faster access to the information by the processor/ASIC than does the medium. This memory 3010 may be a volatile, random access memory such as a dynamic random access memory (DRAM) or static memory (SRAM). It may be located in storage system 3012 or in memory system 3010. The processor 3006 may manipulate the data within the integrated circuit memory 3010 and then copy the data to the storage 3012 after processing is completed. A variety of mechanisms are known for managing data movement between storage 3012 and the integrated circuit memory element 3010, and the disclosure is not limited thereto. The disclosure is not limited to a particular memory system 3010 or a storage system 3012. The system 3000 may include a computer platform that is programmable using a high-level computer programming language. The system 3000 may be also implemented using specially programmed, special purpose hardware, e.g. an ASIC. The system 3000 may include a processor 3006, which may be a commercially available processor such as the well-known Pentium class processor available from the Intel Corporation. Many other processors are available. The processor 3006 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only

What is claimed is:
1. A DC-AC bidirectional converter comprising:
a first interface configured to be coupled to a DC source;
an input bridge coupled to the first interface;
an inverter portion coupled to the input bridge and comprising:

a first bidirectional converter coupled to the input bridge;

a second bidirectional converter coupled to the input bridge; and an output filter coupled to the first bidirectional converter and the second bidirectional converter;

a second interface coupled to the output filter and configured to be coupled to a load; and a controller configured to operate the input bridge to draw DC power from the DC source and provide power to the inverter portion, to operate, in a first mode of operation, the first bidirectional converter, in conjunction with the output filter, to generate a positive half cycle of an output voltage waveform at the second interface, and to operate, in a second mode of operation, the second bidirectional converter, in conjunction with the output filter, to generate a negative half cycle of the output voltage waveform at the second interface, wherein the first bidirectional converter comprises:

a first transformer including a first primary winding and a first secondary winding, the first primary winding including a first end and a second end coupled to the input bridge, and the first secondary winding including a first end coupled to a first center tap via a first portion and a second end coupled to the first center tap via a second portion;

a first switch coupled between the first end of the first secondary winding and the second interface; and a second switch coupled between the second end of the first secondary winding and the second interface, and wherein the second bidirectional converter comprises:

a second transformer including a second primary winding and a second secondary winding, the second primary winding including a first end and a second end coupled to the input bridge, and the second secondary winding including a first end coupled to a second center tap via a first portion and a second end coupled to the second center tap via a second portion;

a third switch coupled between the first end of the second secondary winding and neutral; and a fourth switch coupled between the second end of the second secondary winding and neutral.

2. The DC-AC bidirectional converter of claim 1, wherein the output filter comprises an output filter coupled between the first center tap and the second center tap.

3. The DC-AC bidirectional converter of claim 2, wherein the output filter comprises an output capacitor coupled between the second interface and neutral.

4. The DC-AC bidirectional converter of claim 3, wherein the input bridge comprises:

a plurality of switches coupled to the first interface, the first end of the first primary winding, and the second end of the second primary winding; and a shared line coupled to the plurality of switches, the second end of the first primary winding, and the first end of the second primary winding.

5. The DC-AC bidirectional converter of claim 4, wherein the plurality of switches comprises:

a fifth switch coupled between the first interface and the first end of the first primary winding;

a sixth switch coupled between the first interface and the shared line; and a seventh switch coupled between the first interface and the second end of the second primary winding.

6. The DC-AC bidirectional converter of claim 5, wherein the plurality of switches further comprises:

an eighth switch coupled between the first end of the first primary winding and the DC source;

a ninth switch coupled between the shared line and the DC source; and a tenth switch coupled between the second end of the second primary winding and the DC source.

7. The DC-AC bidirectional converter of claim 4, wherein the controller is further configured to operate, in the first mode of operation, the second bidirectional converter to suppress flux in the second secondary winding generated by current through the third switch with flux in the second secondary winding generated by current through the fourth switch.

8. The DC-AC bidirectional converter of claim 7, wherein the controller is further configured to operate, in the second mode of operation, the first bidirectional converter to suppress flux in the first secondary winding generated by current through the first switch with flux in the first secondary winding generated by current through the second switch.

9. The DC-AC bidirectional converter of claim 1, wherein the second interface is further configured to be coupled to an AC source and to receive input AC power from the AC source, and wherein the controller is further configured to operate the first bidirectional converter, in conjunction with the second bidirectional converter and the input bridge, to provide DC power, derived from the input AC power, to the first interface.

10. A method for operating a DC-AC inverter comprising a first interface configured to be coupled to a DC source, an input bridge coupled to the first interface, an inverter portion coupled to the input bridge, and a second interface configured to be coupled to a load, the inverter portion comprising a first bidirectional converter coupled to the input bridge, a second bidirectional converter coupled to the input bridge, and an output filter coupled to the first bidirectional converter and the second bidirectional converter, the method comprising:

drawing, with the input bridge via the first interface, DC power from the DC source to the inverter portion;

generating, in a first mode of operation with the first bidirectional converter in conjunction with the output filter, a positive half cycle of an output voltage waveform at the second interface; and generating, in a second mode of operation with the second bidirectional converter in conjunction with the output filter, a negative half cycle of an output voltage waveform at the second interface, wherein the first bidirectional converter comprises a first transformer, a first switch, and a second switch, the first transformer including a first primary winding and a first secondary winding, the first secondary winding including a first end coupled to a first center tap via a first portion and a second end coupled to the first center trap via a second portion, the first switch coupled between the first end of the first secondary winding and the second interface, and the second switch coupled between the second end of the first secondary winding and the second interface, wherein the input bridge comprises a plurality of switches coupled to the first interface, the first transformer, and the second transformer, wherein generating, in the first mode of operation with the first bidirectional converter in conjunction with the output filter, the positive half cycle of the output voltage waveform includes operating the first switch, the second switch, and the plurality of switches to generate the positive half cycle of the output voltage waveform at the second interface, wherein the second bidirectional converter comprises a second transformer, a third switch, and a fourth switch, the second transformer including a second primary winding and a second secondary winding, the second secondary winding including a first end coupled to a second center tap via a first portion and a second end coupled to the second center trap via a second portion, the third switch coupled between the first end of the second secondary winding and neutral, and the fourth switch coupled between the second end of the second secondary winding and neutral, and wherein generating, in the second mode of operation with the second bidirectional converter in conjunction with the output filter, the negative half cycle of the output voltage waveform includes operating the third switch, the fourth switch, and the plurality of switches to generate the negative half cycle of the output voltage waveform at the second interface.

11. The method of claim 10, further comprising operating, in the first mode of operation, the second bidirectional converter to suppress flux in the second secondary winding generated by current through the third switch with flux in the second secondary winding generated by current through the fourth switch.

12. The method of claim 11, further comprising operating, in the second mode of operation, the first bidirectional converter to suppress flux in the first secondary winding generated by current through the first switch with flux in the first secondary winding generated by current through the second switch.

13. The method of claim 10, wherein the first interface is further configured to be coupled to an AC source, and wherein the method further comprises:

receiving input AC power from the AC source; and operating the first bidirectional converter, in conjunction with the second bidirectional converter and the input bridge, to provide DC power, derived from the input AC power, to the first interface to charge the DC source.

14. A DC-AC bidirectional converter comprising:

a first interface configured to be coupled to a DC source;

an input bridge coupled to the first interface;

a second interface configured to be coupled to a load; and means for converting DC power from the DC source into an output AC sine wave at the second interface using symmetrical DC-DC conversion paths coupled to the input bridge in parallel and absent use of an intermediate energy storage section, wherein a first path of the symmetrical DC-DC conversion paths is configured to generate a first half of the output AC sine wave at the second interface and a second path of the symmetrical DC-DC conversion paths is configured to suppress flux generated by current from the first path.

15. The DC-DC bidirectional converter of claim 14, further comprising means for sharing a connection between the symmetrical DC-DC conversion paths and the input bridge.

16. The DC-DC bidirectional converter of claim 14, wherein the second interface is further configured to be coupled to an AC source, and wherein the DC-DC bidirectional converter further comprises means for converting AC power from the AC source into DC power to charge the DC source using the symmetrical DC-DC conversion paths coupled to the input bridge in parallel and absent use of an intermediate energy storage section.

* * * * *